US009635377B2

(12) United States Patent
Kim et al.

(10) Patent No.: US 9,635,377 B2
(45) Date of Patent: Apr. 25, 2017

(54) HIGH DYNAMIC RANGE IMAGE PROCESSING DEVICE AND METHOD

(71) Applicant: SAMSUNG ELECTRONICS CO., LTD., Suwon-si (KR)

(72) Inventors: Sung-soo Kim, Suwon-si (KR); Jae-sung Park, Seoul (KR); Min-cheol Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/291,706

(22) Filed: May 30, 2014

(65) Prior Publication Data

US 2015/0003749 A1 Jan. 1, 2015

(30) Foreign Application Priority Data

Jun. 28, 2013 (KR) .................. 10-2013-0075978
Mar. 18, 2014 (KR) .................. 10-2014-0031868

(51) Int. Cl.
*G06K 9/36* (2006.01)
*G06K 9/46* (2006.01)
(Continued)

(52) U.S. Cl.
CPC ............. *H04N 19/463* (2014.11); *G09G 3/34* (2013.01); *G09G 5/003* (2013.01); *H04N 19/30* (2014.11); *H04N 19/85* (2014.11); *G09G 3/3426* (2013.01); *G09G 2320/062* (2013.01); *G09G 2320/0626* (2013.01); *G09G 2320/0646* (2013.01); *G09G 2320/0666* (2013.01);
(Continued)

(58) Field of Classification Search
None
See application file for complete search history.

(56) References Cited

U.S. PATENT DOCUMENTS 7,525,528 B2 * 4/2009 Feng ............................... 345/87
8,982,963 B2 * 3/2015 Gish et al. ............... 375/240.25
(Continued)

FOREIGN PATENT DOCUMENTS

WO 2005/104035 A1 11/2005
WO 2011/107905 A1 9/2011
(Continued)

OTHER PUBLICATIONS

Communication from the European Patent Office issued Oct. 31, 2014, in a counterpart European Application No. 14169991.8.
(Continued)

*Primary Examiner* — Feng Niu
(74) *Attorney, Agent, or Firm* — Sughrue Mion, PLLC

(57) ABSTRACT

Disclosed are a display device for processing and displaying an image signal. The display device includes an image receiver configured to receive packetized image data of an encoded image signal or a bit stream of image data of the encoded image signal, a decoder configured to parse metadata from the packetized image data or bit stream and decode the image signal from the image data of the encoded image signal; and an HDR image processor configured to analyze HDR information in the metadata, and generate an HDR image of the image signal from the analyzed HDR information and the decoded image signal.

59 Claims, 18 Drawing Sheets

(51) Int. Cl.
*H04N 19/463* (2014.01)
*H04N 19/30* (2014.01)
*H04N 19/85* (2014.01)
*G09G 5/00* (2006.01)
*G09G 3/34* (2006.01)

(52) U.S. Cl.
CPC ............ *G09G 2320/0673* (2013.01); *G09G 2340/0407* (2013.01); *G09G 2360/16* (2013.01); *G09G 2370/04* (2013.01); *G09G 2370/10* (2013.01)

(56) References Cited

U.S. PATENT DOCUMENTS

| | | | |
|---|---|---|---|
| 2002/0154691 A1* | 10/2002 | Kost et al. | 375/240.01 |
| 2006/0103621 A1* | 5/2006 | Feng | 345/102 |
| 2011/0126232 A1* | 5/2011 | Lee et al. | 725/39 |
| 2011/0188744 A1* | 8/2011 | Sun | 382/162 |
| 2011/0193896 A1* | 8/2011 | Johnson | 345/690 |
| 2011/0194618 A1* | 8/2011 | Gish et al. | 375/240.25 |
| 2011/0292246 A1* | 12/2011 | Brunner | 348/231.99 |
| 2012/0026519 A1* | 2/2012 | Yoshida | 358/1.11 |
| 2012/0230597 A1 | 9/2012 | Ward et al. | |
| 2012/0254633 A1* | 10/2012 | Vilhauer et al. | 713/300 |
| 2013/0114912 A1* | 5/2013 | Schirris | G06T 5/00 382/274 |
| 2013/0170540 A1* | 7/2013 | Damkat et al. | 375/240.01 |

FOREIGN PATENT DOCUMENTS

| | | |
|---|---|---|
| WO | 2012/035476 A1 | 3/2012 |
| WO | 2012/122425 A1 | 9/2012 |
| WO | 2012/122426 A1 | 9/2012 |
| WO | 2012/142471 A1 | 10/2012 |
| WO | 2012/147018 A2 | 11/2012 |
| WO | 2014/163793 A2 | 10/2014 |

OTHER PUBLICATIONS

Communication from the European Patent Office issued Jan. 28, 2015, in a counterpart European Application No. 14169991.8.

Mantiuk R et al, "Backward Compatible High Dynamic Range MPEG Video Compression", ACM Transactions on Graphics, Jul. 30, 2006 (Jul. 30, 2006), pp. 713-723, XP007902456.

Martin Winken et al, "Bit-Depth Scalable Video Coding", Image Processing, 2007. ICIP 2007. IEEE International Conference on, IEEE, PI, Sep. 1, 2007 (Sep. 1, 2007), pp. 1-5, XP031157664.

Segall A et al, "New Results with the Tone Mapping SEI Message", 21. JVT Meeting; 78. MPEG Meeting; Oct. 20, 2006-Oct. 27, 2006; Hangzhou,CN; JTC1/SC29/WG11 and ITU-T SG.16 Q.6), No. JVT-U041, Oct. 17, 2006 (Oct. 17, 2006), XP030006687, total 8 pages.

Takao Jinno et al, "New local tone mapping and two-layer coding for HDR images", IEEE International Conference on Acoustics, Speech and Signal Processing, Mar. 25, 2012 (Mar. 25, 2012)-Mar. 30, 2012 (Mar. 30, 2012), pp. 765-768, XP032227239.

Kerofsky L et al, "Color Gamut Scalable Video Coding", 11. JCT-VC Meeting; Oct. 10, 2012-Oct. 19, 2012; Shanghai; (Joint Collaborative Team on Video Coding of ITU-T SG16 WP3 and ISO/IEC JTC1/SC29/WG11); URL: http://wftp3.itu.int/av-arch/jctvc-site/, No. JCTVC-K0241, Oct. 2, 2012 (Oct. 2, 2012), XP030113123, total 11 pages.

\* cited by examiner

Lower Mapping Function

Upper Mapping Function

HIGH DYNAMIC RANGE IMAGE PROCESSING DEVICE AND METHOD

CROSS-REFERENCE TO RELATED APPLICATIONS

This application claims priority from Korean Patent Application No. 10-2013-0075978 filed on Jun. 28, 2013 in the Korean Intellectual Property Office and Korean Patent Application No. 10-2014-0031868 filed on Mar. 18, 2014 in the Korean Intellectual Property Office, the disclosures of which are incorporated herein by reference in their entireties.

BACKGROUND

Field

Apparatuses and methods consistent with exemplary embodiments relate to an image processing device and an image processing method, and more particularly, to an image processing device and an image processing method configured to transmit an image signal containing high dynamic range (hereinafter, to be called "HDR") information as additional information for each scene or frame and to analyze and decode and process the image signal into an image to be displayed by a display device to thereby fully express potential of the display device.

Description of the Related Art

In a natural environment a very wide range of brightness levels are present from, e.g., a very dark scene such as a night sky to a very bright scene such as the light of the sun. Additionally, the natural environment has a wide dynamic range from a very dark portion to a very bright portion in a single scene. However, due to the limitation of maximum brightness and limitation of expressiveness for a transmitted input signal, normal display devices rarely express a dynamic range or corresponding brightness ratio that a human visual system may experience from a real natural environment.

Image producers may produce full high definition (FHD) images or ultra high definition (UHD) images with 10-bit or 12-bit for each pixel with high dynamic range that have been photographed by an image signal generator 12, as shown in FIG. 18, such as a camera. The FHD images or UHD images with HDR that have been produced as above may be converted into a lower number of bits such as 8 bits per pixel by taking into account communication bandwidth or capability of a user's display device. Then, as shown in FIG. 18, the images are encoded by a high efficiency video coding (HEVC) encoder 14 and compressed into an HEVC bit stream for transmission. As shown in FIG. 19, the transmitted HEVC bit stream is received by a bit stream receiver 22, and is decoded by an HEVC decoder 24, and then transmitted to a timing controller 26 and finally displayed by an image output portion 28 such as a display panel. Typically, an 8-bit per pixel image has a narrower dynamic range than a 10-bit or 12-bit per pixel image. Encoding a 10-bit or 12-bit image is expected to significantly increase bandwidth usage. Even if an image with a high bit depth is transmitted, such as 10-bit or 12-bit HDR images, the receiving display device may not properly display the image if the display device is an 8-bit image display device due to the limited expressiveness of such display device.

A display device may have a fixed dynamic range for expressing an input image for each frame. However, an image in a single scene may have a very dark background portion including a particularly bright portion. On the contrary, there may be a case where a particular portion of a very bright image should be displayed very dark.

When a brightness of a particular bright portion of a very dark image is different from a maximum brightness of a very bright image, the image may give a sense of reality similar to the case of how human eyes would experience the scene from viewing the real environment. Even if it is considered that the display device has a limitation in minimum/maximum brightness due to hardware, the display devices fail to provide a user experience factor from a reality aspect that may otherwise be provided to a user.

SUMMARY

Accordingly, one or more exemplary embodiments provide an image processing device and a display device configured to express a high dynamic range (HDR) image without a significant increase in a bandwidth.

According to an aspect of an exemplary embodiment, there is provided an image processing device for processing an image signal including a metadata generator configured to generate metadata including high dynamic range (HDR) information of an image signal, an image encoder configured to encode the image signal as one of packetized image data of the encoded image signal and a bit stream of image data of the encoded image signal, and an HDR message generator configured to generate an HDR message including the generated metadata in a reserved area of the one of the packetized image data and the bit stream.

The reserved area may include at least one of a picture parameter set (PPS) extended data area and a supplemental enhancement information (SEI) data area of a network abstraction layer (NAL) unit.

The metadata may be included in an extended layer of the packetized image data or the bit stream.

The metadata may be included in a base layer of the packetized image data or the bit stream.

The metadata may be included in an extended layer and a base layer of the packetized image data or the bit stream.

The HDR information may include at least one of minimum and maximum brightness information for each scene or frame, backlight peaking information including backlight unit (BLU) brightness mapping parameter for each scene or frame, color specification information including color gamut and color temperature of an image, a transfer parameter including gamma adjust and contrast enhancement (CE) control parameter, scene information including surrounding environment information of a scene or frame timeline, histogram information showing lowest, highest and most frequent pixel value information, sharpness information showing strength information of a boundary area of an image, and correlation information of scenes or frames.

The metadata may include first metadata of a first scene or frame, and wherein second metadata of a second scene or frame adjacent to the first scene or frame that is the same as the first metadata is omitted.

Correlation of the scenes or frames may include correlation of metadata of scenes or frames.

According to an aspect of another exemplary embodiment, there is provided a display device for processing and displaying an image signal including an image receiver configured to receive packetized image data of an encoded image signal or a bit stream of image data of the encoded image signal, a decoder configured to parse metadata from the packetized image data or bit stream and decode the image signal from the image data of the encoded image signal, and an HDR image processor configured to analyze HDR information in the metadata, and generate an HDR image of the image signal from the analyzed HDR information and the decoded image signal.

The HDR information may include at least one of minimum and maximum brightness information for each scene or frame, backlight peaking information including BLUE brightness mapping parameter for each scene or frame, color specification information including color gamut and color temperature of an image, a transfer parameter including gamma adjust and CE control parameter, scene information including surrounding environment information of a scene or frame timeline, histogram information showing lowest, highest and most frequent pixel value information, sharpness information showing strength information of a boundary area of an image, and correlation information of scenes or frames.

The HDR image processor may be further configured to adjust the generated HDR image.

The display device may further include a storage portion configured to store the analyzed HDR information.

The HDR image processor may be further configured to generate HDR backlight information using the generated HDR image.

The HDR image processor may be further configured to adjust the generated HDR backlight information using the HDR information.

The HDR image processor may be further configured to adjust the generated HDR backlight information using the adjusted HDR image.

The HDR image processor may be further configured to estimate a final output brightness level of an HDR image according to the generated HDR backlight information and compensate for deficient or excessive brightness.

The HDR image processor may be further configured to adjust the generated HDR image using the adjusted HDR backlight information.

The HDR image processor may be further configured to obtain brightness information of a backlight local block using backlight peaking information of the HDR information.

The HDR image processor may be further configured to obtain minimum brightness information and maximum brightness information of an HDR image using minimum brightness information and maximum brightness information of the HDR information for each scene or each frame.

The HDR image processor may be further configured to perform mapping of minimum brightness information and maximum brightness information of the HDR image to minimum brightness information and maximum brightness information of a backlight by using minimum brightness information and maximum brightness information of the HDR information for each scene or each frame and scene information.

The HDR image processor may be further configured to generate or adjust HDR backlight information using the HDR information, and display device information.

The HDR image processor may be further configured to perform tone mapping for adjusting a change in a bit resolution of an HDR image using a transfer parameter of the HDR information.

The HDR image processor may be further configured to adjust the HDR backlight information using panel minimum brightness information and maximum brightness information.

The adjusted HDR backlight information may be adjusted by applying a maximum power limit of the backlight.

The HDR image processor may be further configured to perform color mapping using the HDR information and backlight features.

The HDR image processor may be further configured to calculate a brightness output of the backlight according to following formula $YLCD=Yinput/Ybacklight$ According to an aspect of another exemplary embodiment, there is provided a display device for processing and displaying an image signal including an image receiver configured to receive packetized image data of an encoded image signal or a bit stream of image data of the encoded image signal, a decoder configured to parse metadata from the packetized image data or bit stream and decode the image signal from the image data of the encoded image signal, a storage portion configured to store HDR information therein, and an HDR image processor configured to generate an HDR image signal of the image signal from the stored HDR information and the decoded image signal.

The HDR information may include at least one of minimum and maximum brightness information for each scene or frame, backlight peaking information including BLU brightness mapping parameter for each scene or frame, color specification information including color gamut and color temperature of an image, a transfer parameter including gamma adjust and CE control parameter, scene information including surrounding environment information of a scene or frame timeline, histogram information showing lowest, highest and most frequent pixel value information, sharpness information showing strength information of a boundary area of an image, and correlation information of scenes or frames.

The HDR image processor may be further configured to adjust the generated HDR image.

The HDR image processor may be further configured to generate HDR backlight information using the generated HDR image.

The HDR image processor may be further configured to adjust the generated HDR backlight information using the HDR information.

The HDR image processor may be further configured to estimate a final output brightness level of an HDR image according to the generated HDR backlight information, and compensate for deficient or excessive brightness.

The HDR image processor may be further configured to adjust HDR information using the adjusted HDR backlight information or adjust the generated HDR backlight information using the adjusted HDR image.

According to an aspect of another exemplary embodiment, there is provided a display device for processing and displaying an image signal including an image receiver configured to receive packetized image data of an encoded image signal or a bit stream of image data of the encoded image signal, a decoder configured to parse metadata from the packetized image data or bit stream and decode the image signal from the image data of the encoded image signal, and an HDR image processor configured to analyze the image signal, generate HDR information from the image signal, generate an HDR image from the HDR information and decoded image signal, and generate HDR backlight information using the HDR image.

The HDR image processor may be further configured to adjust the generated HDR image.

The HDR image processor may be further configured to adjust the generated HDR backlight information using the HDR information.

The HDR image processor may be further configured to estimate a final output brightness level of an HDR image according to the generated HDR backlight information, and compensate for deficient or excessive brightness.

The HDR image processor may be further configured to adjust HDR information using the adjusted HDR backlight information or adjust the generated HDR backlight information using the adjusted HDR image.

According to an aspect of another exemplary embodiment, there is provided a method for processing an image signal, the method including generating metadata including high dynamic range (HDR) information of an image signal, encoding the image signal as one of packetized image data of the encoded image signal and a bit stream of image data of the encoded image signal, and generating an HDR message including the generated metadata in a reserved area of the one of the packetized image data and the bit stream.

According to an aspect of another exemplary embodiment, there is provided a method for processing an image signal, the method including receiving packetized image data of an encoded image signal or a bit stream of image data of the encoded image signal, parsing metadata from the packetized image data or bit stream and decode the image signal from the image data of the encoded image signal, analyzing HDR information in the metadata, and generating an HDR image of the image signal from the analyzed HDR information and the decoded image signal.

The method may further include adjusting the generated HDR image.

The method may further include generating HDR backlight information using the generated HDR image.

The method may further include adjusting the generated HDR backlight information using the HDR information.

The method may further include estimating a final output brightness level of the HDR image according to the generated HDR backlight information, and compensating for deficient or excessive brightness.

The method may further include adjusting the HDR image using the HDR backlight information, or adjusting the HDR backlight information using the HDR image.

According to an aspect of another exemplary embodiment, there is provided a method for processing an image signal, the method including receiving packetized image data of an encoded image signal or a bit stream of image data of the encoded image signal, parsing metadata from the packetized image data or bit stream and decode the image signal from the image data of the encoded image signal, storing HDR information in a storage portion, and generating an HDR image signal of the image signal from the stored HDR information and the decoded image signal.

The method may further include adjusting the generated HDR image.

The method may further include generating HDR backlight information using the generated HDR image.

The method may further include adjusting the generated HDR backlight information using the HDR information.

The method may further include estimating a final output brightness level of the HDR image according to the generated HDR backlight information, and compensating for deficient or excessive brightness.

The method may further include adjusting the HDR image using the adjusted HDR backlight information, or adjusting the generated HDR backlight information using the adjusted HDR image.

According to an aspect of another exemplary embodiment, there is provided a method for processing an image signal, the method including receiving packetized image data of an encoded image signal or a bit stream of image data of the encoded image signal, parse metadata from the packetized image data or bit stream and decode the image signal from the image data of the encoded image signal, analyzing the image signal, generating HDR information from the image signal, generating an HDR image from the HDR information and decoded image signal, and generating HDR backlight information using the HDR image.

The method may further include adjusting a display HDR image to be displayed using the generated HDR image.

The method may further include adjusting the generated HDR backlight information using the HDR information.

The method may further include estimating a final output brightness level of an HDR image according to the generated HDR backlight information, and compensating for deficient or excessive brightness.

The method may further include adjusting the HDR image using the adjusted HDR backlight information, or adjusting the generated HDR backlight information using the adjusted HDR image.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
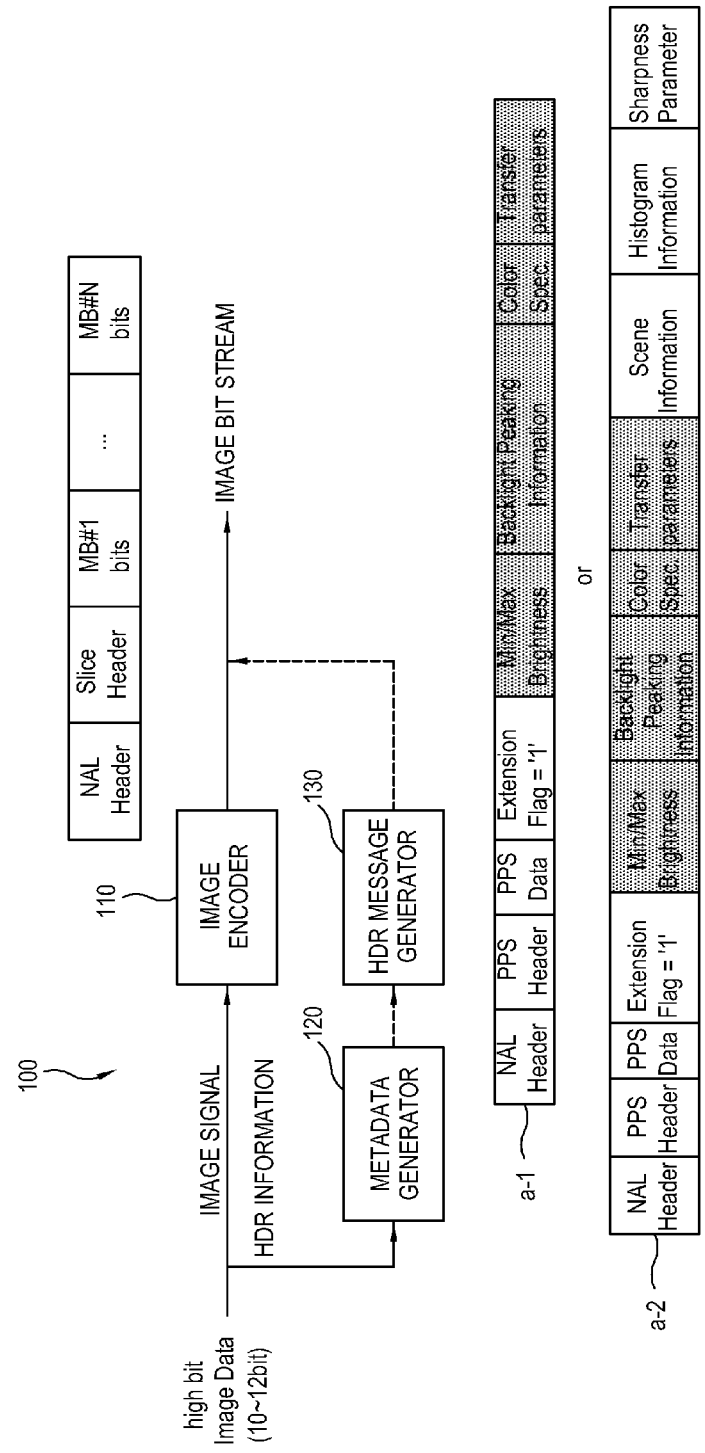
FIGS. 1 and 2 are block diagrams of an image processing device according to one or more exemplary embodiments.

Below, exemplary embodiments will be described in detail with reference to accompanying drawings so as to be easily realized by a person having ordinary knowledge in the art. The exemplary embodiments may be embodied in various shapes without being limited to the exemplary embodiments set forth herein. Descriptions of well-known parts are omitted for clarity, and like reference numerals refer to like elements throughout.

High dynamic range (HDR) information that is used for transmitting and displaying images according to an exemplary embodiment refers to additional information of an image that allows the reproduction of a greater dynamic range of luminosity, which may more accurately represent the range of intensity levels found in real environments. This additional HDR information that is generated may help fully express an intention that an image producer, e.g., a movie director wishes to emphasize or express for a particular scene or a particular object, and photographing environment information and potential ability of a display device. FIG. 1 illustrates an image processing device 100 according to an exemplary embodiment. The image processing device 100 may include an encoder 110, a metadata generator 120 and an HDR message generator 130. Encoding of the image processing device 100 may be implemented by hardware or software.

The image processing device 100 may be used by broadcasting stations providing various videos, cable broadcasting service providers and content suppliers such as content portals.

In an exemplary embodiment, HDR information that is generated during production of images is used. Produced or received image data and HDR information may be encoded by an existing codec such as, e.g., high efficiency video coding (HEVC), Moving Picture Experts Group-Scalable Video Coding (MPEG-SVC) or Advanced Video Coding (AVC).

Image data may be obtained by using an image producing device such as a camera at an initial phase of producing images. The image producer may generate HDR information by taking into account the producer's intention, production environment, and features of the display device that expresses images.

The encoder 110 may encode produced or received image data through existing codec such as HEVC, MPEG-SVC, or AVC for transmission or storage. The encoded image data may be formed as a packet or a bit stream.

Image signals may be transmitted in proper bits by taking into account a display device that finally displays an image and a transmission bandwidth. That is, if there is a network environment with a UHD TV and a sufficient bandwidth, 12-bit or 16-bit image signals may be transmitted. Alternatively, if there is a network environment with a display device such as a HD TV or a FHD TV along with a narrow bandwidth, 8-bit or 10-bit image signals may be transmitted.

The metadata generator 120 may generate metadata for each frame or each scene by using HDR information of image data that is generated during production. The HDR information may not always be generated only during production, and may be transmitted through wired/wireless networks or may be stored in a storage medium for usage.

The HDR information may include at least one of the following: minimum and maximum brightness information for each scene or each frame; backlight peaking information including brightness mapping parameter of a backlight unit for each scene or each frame; color specification information including color gamut and color temperature of an image; a transfer parameter including gamma adjust and contrast enhancement (CE) control parameter; scene information including surrounding environment information of a scene or frame timeline; histogram information showing lowest, highest and most frequent pixel value information; sharpness information showing strength information of a boundary area of an image; and correlation information for scenes or frames.

Figure 2:
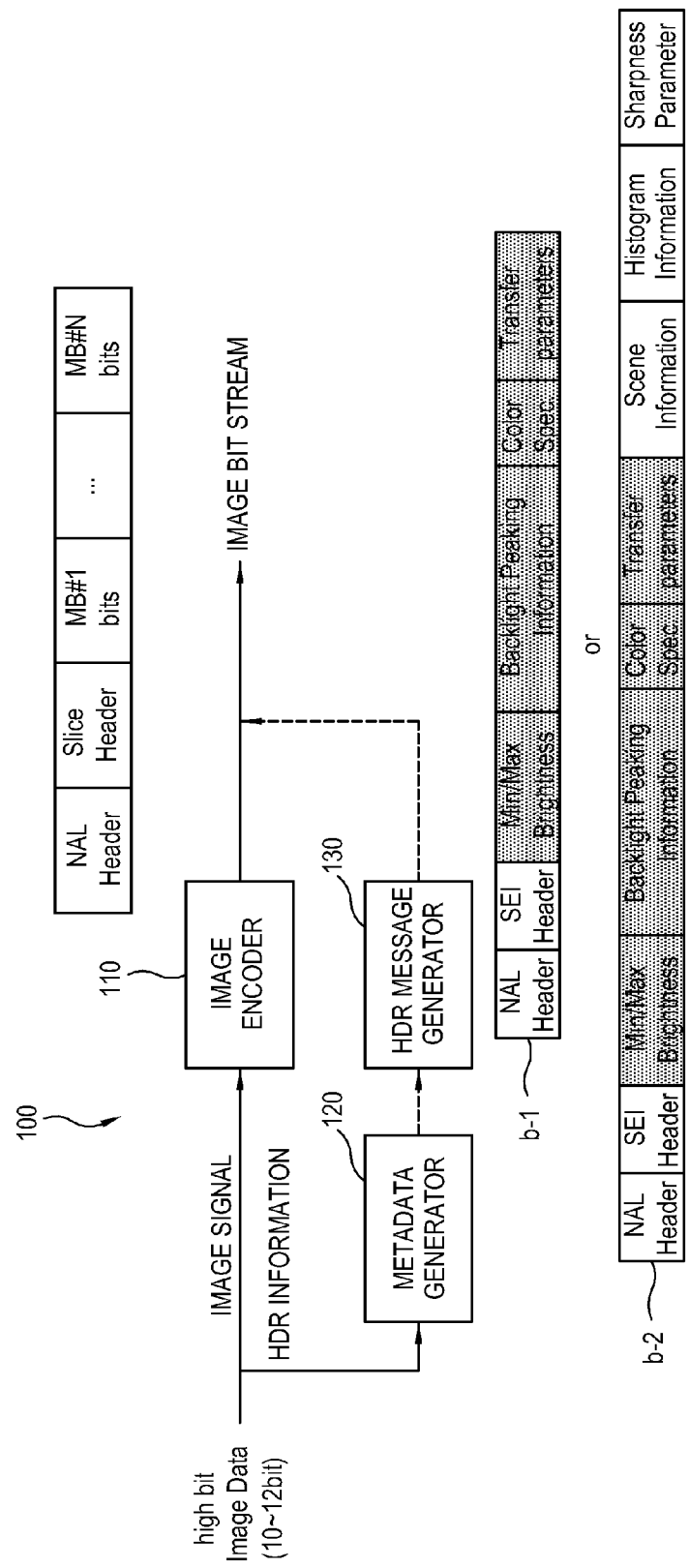

As shown in FIGS. 1 and 2, the HDR message generator 130 may generate an HDR message including the generated metadata in a reserved area of a network abstraction layer (NAL) unit of a packet or a bit stream, e.g., a data area of a picture parameter set (PPS) extended area (a-1 and a-2 in FIG. 1) or a data area of supplemental enhancement information (SEI) (b-1 and b-2 in FIG. 2) to transmit or store the generated metadata as above. The reserved area means a preliminary area that is not a data area defined by codec standards.

Metadata may be classified into compulsory data and optional data. The compulsory data should be always included, and the optional data may be included only when there are data to be transmitted. Therefore, the quantity of metadata to be transmitted may vary.

As shown in a-1 and b-1 in FIGS. 1 and 2, the data area of the PPS extended area or the SEI data area may include, as compulsory HDR information, min/max brightness information for each scene or each frame; backlight peaking information including brightness mapping parameter of a backlight unit for each scene or each frame; color specification information including color gamut and color temperature of an image; and a transfer parameter including gamma adjust and contrast enhancement (CE) control parameter.

As shown in a-2 and b-2 in FIGS. 1 and 2, the data area of the PPS extended area or the SEI data area may include, as optional HDR information, scene information including surrounding environment information of a scene or frame timeline; histogram information showing lowest, highest and most frequent pixel value information; and sharpness information showing strength information of a boundary area of an image, in addition to compulsory HDR information. Of course, the optional HDR information is not limited to the foregoing three types, and may further include additional information such as correlation information for scenes or frames and backlight feature information (APC and diffuser information).

Figure 3:
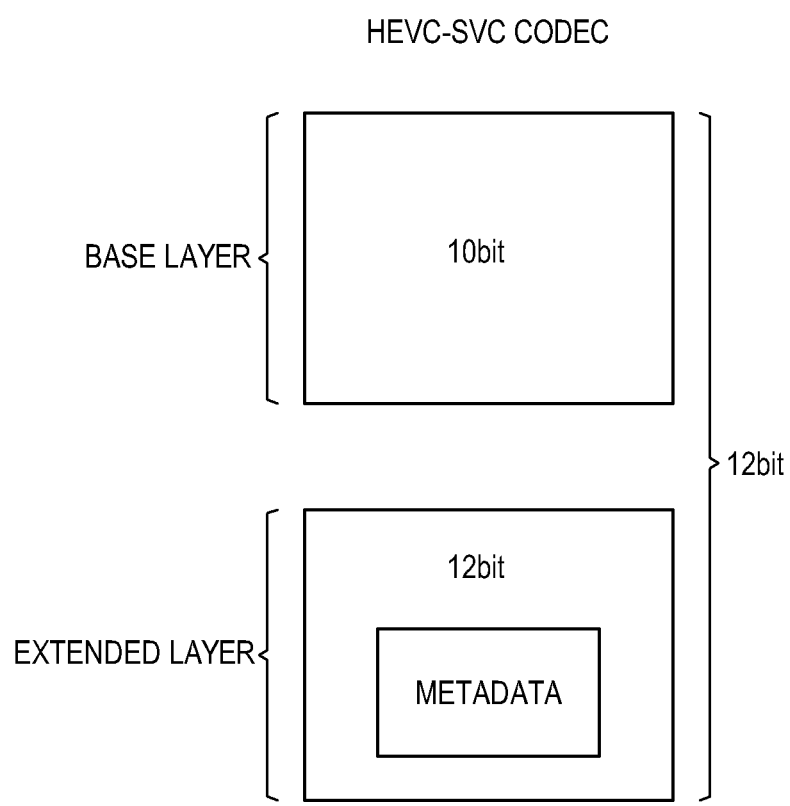
FIGS. 3 to 5 illustrate configurations of a packet or a bit stream using metadata according to one or more exemplary embodiments.
Figure 4:
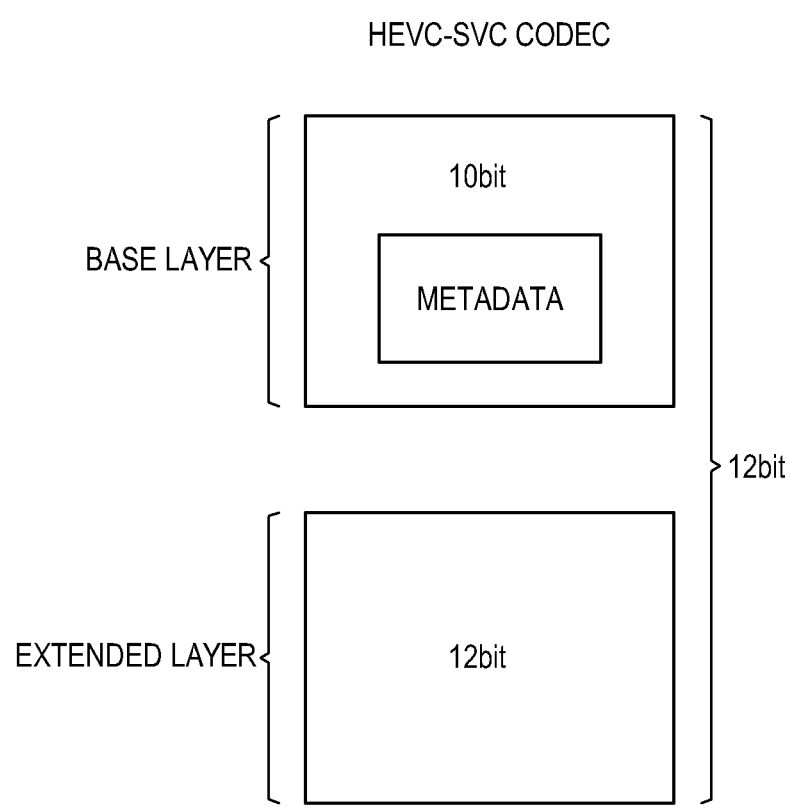
Figure 5:
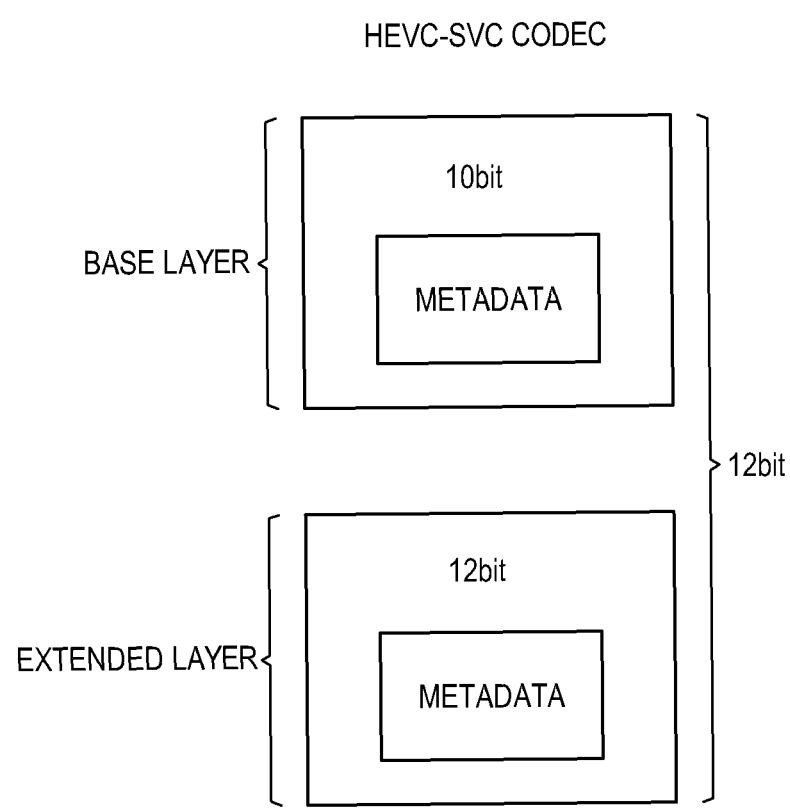

FIGS. 3 to 5 illustrate examples of a packet or a bit stream for transmitting metadata by HEVC-SVC codec according to one or more exemplary embodiments. Not only HEVC-SVC code but also other codecs such as MPEG-SVC and AVC may be used to transmit metadata including HDR information.

As shown in FIG. 3, metadata may be transmitted by being included in an extended layer of a bit stream packet including 10-bit compatible base layer and 12-bit extended layer.

As shown in FIG. 4, metadata may be transmitted by being included in a base layer of a bit stream packet including a 10-bit compatible base layer and a 12-bit extended layer.

As shown in FIG. 5, metadata may be transmitted by being divided and included in a base layer and an extended layer of a bit stream packet including a 10-bit compatible base layer and a 12-bit extended layer.

Quantity of metadata to be additionally transmitted may be changed by using payloadSize value within a PPS header or an SEI header.

According to an exemplary embodiment, the first 4 bits of metadata payload may show the type of metadata, and may include various available HDR information as in table 1.

Arrangement order of metadata to be transmitted may not need to be fixed, and each data may be independently identified even if the data are arranged in a certain order. Table 1 below shows examples of available metadata. Of course, HDR information shown in Table 1 is examples for purpose of description, and is not limited thereto.

TABLE 1

| Value (4 bits) | Metadata | Description | Importance |
|---|---|---|---|
| 0 | Min/Max Brightness | Maximum/minimum brightness of image (HDR info.) | Compulsory |
| 1 | Backlight Peaking Information | Display BLU brightness mapping parameter | Compulsory |
| 2 | Color Spec. | Color gamut & temperature of image | Compulsory |
| 3 | Transfer Parameter | Gamma and CE control parameter | Compulsory |
| 4 | Scene Information | scene information such as inside/outside and night/day | Optional |
| 5 | Histogram Information | Lowest, highest and optimum pixel value information | Optional |
| 6 | Sharpness Parameter | strength information of boundary area of image | Optional |
| 7-15 | Reserved | | Optional |

The metadata information may be transmitted for each frame. However, to minimize an increase in a bit rate, the metadata that is the same as the value of the previous frame may not necessarily be transmitted, in which case even compulsory metadata may be omitted. If an HDR message parsing portion 221 or a metadata analysis portion 232 of the display device 200 fails to find the value as shown in Table 1 above, the concerned metadata may maintain the previous value.

Min/max brightness information may be indicated as 10 bits or 12 bits, respectively, depending on a brightness range to be expressed. Table 2 shows min/max brightness information if 10 bits are used. This min/max brightness information shows the actual brightness range at the time of photographing images. Accordingly, to display an image by the display device, an optimum image is generated by taking into account brightness that may be provided by the display device.

TABLE 2

| Value (10 bits) | Min Brightness | Max Brightness |
|---|---|---|
| 0 | 0 nits | — |
| 1 | 0.001 nits | 4 nits |
| 2 | 0.002 nits | 8 nits |
| ... | ... | ... |
| 128 | 0.128 nits | 512 nits |
| ... | ... | ... |
| 512 | 0.512 nits | 2,048 nits |
| ... | ... | ... |
| 1000 | 1 nits | 4,000 nits |

A backlight transfer parameter may be transmitted to optimize backlight brightness of the display device. If a maximum brightness that may be expressed by the display device is higher than a maximum brightness of metadata, brightness may be controlled by a gain curve defined by the backlight transfer parameter rather than by increasing the brightness linearly, to thereby obtain an optimum HDR picture quality. Table 3 below is a lookup table (LUT) for backlight peaking information, and shows gain information on whether to increase or decrease the quantity of backlight information. The LUT for the backlight peaking information may be transmitted for each frame or each scene.

The backlight peaking information may also apply to the case where a maximum brightness that may be expressed by the display device is lower than a maximum brightness of metadata. In such case, a particular brightness area may be emphasized without reducing total brightness. Brightness levels to be emphasized may be set differently according to the content producer's intention. A viewer may view optimum images that are consistent with the content producer's intention.

TABLE 3

| BLU Step | Gain |
|---|---|
| 0 | 1.050 |
| 1 | 1.037 |
| 2 | 1.025 |
| 3 | 1.012 |
| 4 | 1.000 |
| 5 | 1.000 |
| 6 | 1.000 |
| 7 | 1.000 |
| 8 | 1.000 |
| 9 | 1.000 |
| 10 | 1.025 |
| 11 | 1.050 |
| 12 | 1.075 |
| 13 | 1.100 |
| 14 | 1.150 |
| 15 | 1.200 |

Color specification information may be indicated as bits as shown in Table 4 below. Additionally, color temperature information for each color gamut may be transmitted. If a user color is set, CIE x and y coordinates may be indicated as 10 bits, respectively, with respect to R, G, B and W. The color specification information may be used to realize optimum colors as intended by the content producer in the display device.

TABLE 4

| Value (4 bits) | Color Gamut | Additional Data |
|---|---|---|
| 0 | BT.709 (sRGB) | Color Temp. |
| 1 | DCI-P3 | Color Temp. |
| 2 | BT.2020 | Color Temp. |
| 3 | AdobeRGB | Color Temp. |
| 4 | EBU | Color Temp. |
| 5 | SMPTE-C | Color Temp. |
| 6 | NTSC | Color Temp. |
| 7 | User defined gamut | R, G, B and W coordinates are expressed as additional 8 bytes. |
| 8~15 | Reserved | |

Major parameters may be transmitted to perform contrast enhancement by adjusting a gamma curve as shown in Table 5.

TABLE 5

| Parameter | Description | Equation |
|---|---|---|
| Lower Mapping Basis | Lower curve degree (bl) | $y = x - bl * (x - x2)$ |
| Upper Mapping Basis | Upper curve degree (bu) | $y = x - bu * (x2 - x)$ |
| Lower Gain | Gain of values that become lower than input values | |

TABLE 5-continued

| Parameter | Description | Equation |
| --- | --- | --- |
| Upper Gain | Gain of values that become higher than input values | |
| Center Point | Lower & upper curve intersection | |
| Lower Offset | Lower curve offset | |
| Upper Offset | Upper curve offset | |

In addition to the HDR information explained above, accessional HDR information may be generated and transmitted to display HDR images as shown in Table 1. The optional metadata which are transmitted in addition to the compulsory metadata assist with the compulsory metadata. Scene information may assist with the backlight adjustment to express a more realistic image by adjusting backlight peaking information. Scene information may replace min/max brightness information in certain cases. Histogram information and sharpness parameter supplement the transfer parameter information to secure the best picture quality.

Metadata are expected to be approximately 20 bytes for each frame. If image information is transmitted in 60 Hz, only a bandwidth of 10 kbps (20 bytes×8 bits×60 Hz) is used.

Because the respective metadata are transmitted only when necessary, such as for change of scenes, without a need to be transmitted for each frame, the bandwidth that is actually increased may be 1 kpbs or less.

Figure 6:
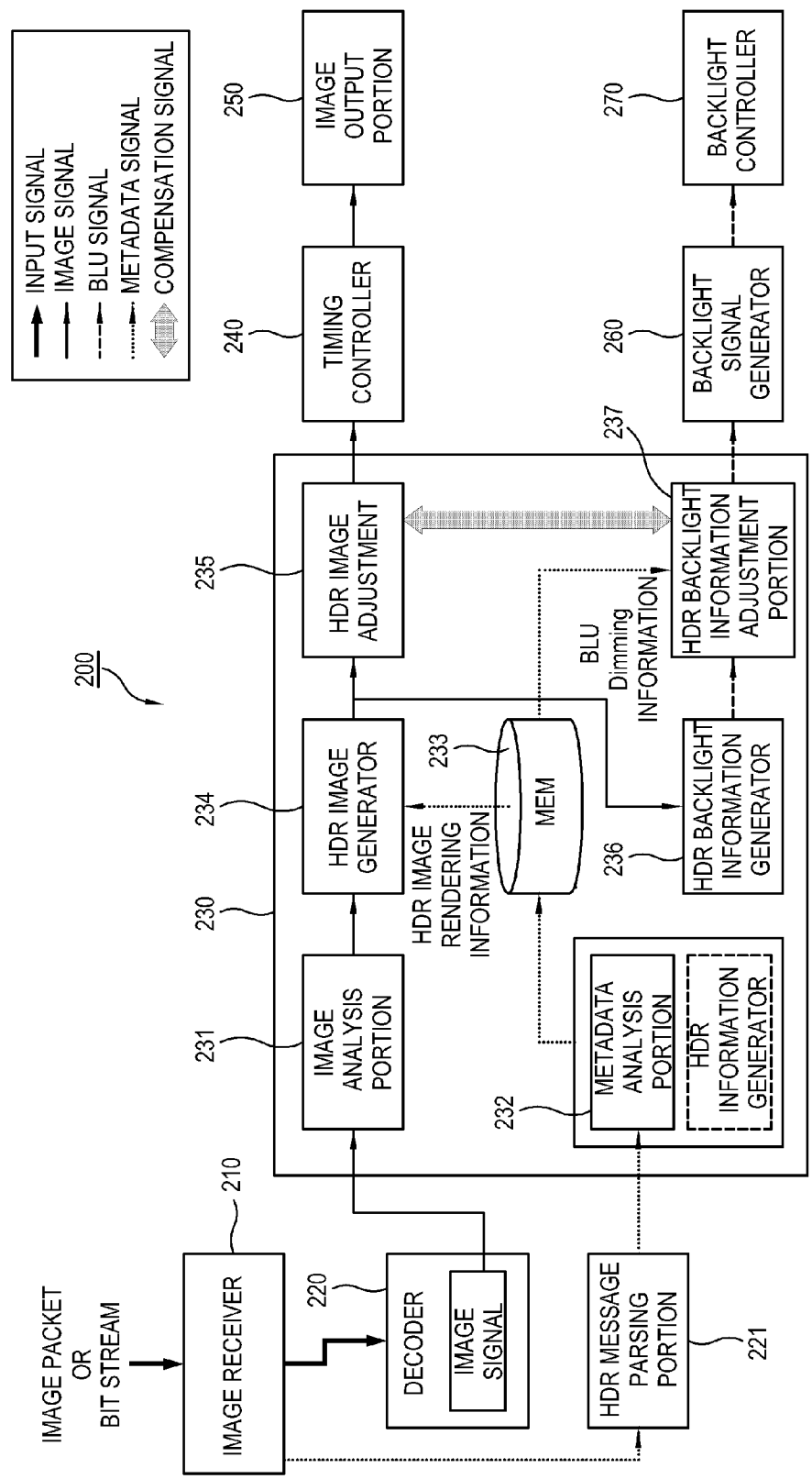
FIG. 6 illustrates a display device according to a first exemplary embodiment.

FIG. 6 illustrates a display device 200 according to a first exemplary embodiment.

The display device 200 may display an optimum HDR image by using metadata that have been generated and transmitted by the encoder in FIGS. 1 and 2. The display device 200 may restore the transmitted image information and metadata. The restored image is restored to an HDR image after image enhancement using color specification, gamma adjust and contrast enhancement information by the image analysis portion 231. Based on the HDR image, backlight brightness is calculated to express an optimum dynamic range of the display device 200. Backlight brightness of a black area and a peak area of a displayed image may be adjusted to minimum and maximum brightness by using the backlight peaking information as the compulsory metadata. To do the foregoing, information on a backlight type (edge/direct BLU) of the display device 200 or the number of dimming control blocks should be provided, and such information should be stored in the display device 200.

Referring to FIG. 6, the display device 200 for processing the HDR image will be described in detail.

The display device 200 may include an image receiver 210, a decoder 220, an HDR message parsing portion 221, an HDR image processor 230, a timing controller (T-CON) 240, an image output portion 250, a backlight signal generator 260 and a backlight controller 270.

The display device 200 may include a display device such as a television (TV), a set-top box or a computer that may process images. Processing images by the display device 200 may be implemented by hardware or software.

The image receiver 210 may receive an image packet or bit stream encoded by the image processing device 100 shown in FIG. 1.

The decoder 220 may decode the received image packet or bit stream to divide an image signal therefrom.

The HDR message parsing portion 221 may parse an HDR message included in a reserved area of the received image packet or bit stream, e.g., a reserved area of a network abstraction layer (NAL) unit, a data area of a picture parameter set (PPS) extended area (a-1 and a-2 in FIG. 1) or a data area of supplemental enhancement information (SEI) (b-1 and b-2 in FIG. 2) to obtain HDR metadata.

The HDR image processor 230 may include an image analysis portion 231, a metadata analysis portion 232, a storage portion 233, an HDR image generator 234, an HDR image adjustment portion 235, an HDR backlight information generator 236, and an HDR backlight information adjustment portion 237. The HDR image processor 230 may be implemented as hardware or software.

The image analysis portion 231 analyzes an image signal that is divided by the decoder 220.

The metadata analysis portion 232 analyzes metadata divided by the decoder 220, and obtains HDR information therefrom.

The storage portion 233 may store therein HDR information that is obtained by the metadata analysis portion 232. Of course, the storage portion 233 may store therein an operating system (OS), image data and other various data or software in addition to the HDR information. According to an exemplary embodiment, the storage portion 233 is separate from the HDR image processor 230 rather than being included therein. The storage portion 233 is shown in accompanying drawings as being included in the HDR image processor 230 in accordance with another exemplary embodiment.

The HDR image generator 234 may generate an HDR image of an image signal analyzed by the image analysis portion 231, by using the HDR information obtained by the metadata analysis portion 232 as HDR image rendering information. The HDR image rendering information may include, as compulsory HDR information, min/max brightness information for each scene or each frame, color specification information including color gamut and color temperature of an image, and transfer parameter including gamma adjust and CE control parameter. The HDR image rendering information may further include, as optional HDR information, histogram information showing lowest, highest, and most frequent pixel value information, sharpness information showing strength information of a boundary area of an image, and correlation information for scenes or frames.

The HDR image adjustment portion 235 may adjust an HDR image by using HDR backlight information provided by the HDR backlight information adjustment portion 237. The HDR image adjustment portion 235 may transmit the adjusted HDR image to the timing controller (T-CON) 240 and display the adjusted HDR image through the image output portion 250.

The HDR backlight information generator 236 generates HDR backlight information by using an HDR image.

The HDR backlight information adjustment portion 237 may adjust the generated HDR backlight information by using the HDR information stored in the storage portion 234 or obtained by the metadata analysis portion 232 as backlight dimming information. The backlight dimming information may include backlight peaking information including brightness mapping parameter of a backlight unit for each scene or each frame, as compulsory HDR information. The backlight dimming information may further include scene information including surrounding environment information of a scene or frame timeline and backlight feature information.

Of course, the HDR backlight information adjustment portion 237 may use a HDR image that is adjusted by the HDR image adjustment portion 235.

The backlight information adjustment portion 237 may calculate backlight brightness to express an optimum dynamic range of an HDR image by the display device 200. For example, a backlight brightness of a black area and a peak area of a displayed image may be adjusted into minimum and maximum brightness by using the min/max brightness values and histogram information shown in [Table 2]. That is, the backlight information adjustment portion 237 adjusts brightness information of each frame of an image by using the HDR information. The backlight signal generator 260 generates a brightness control signal (dimming signal) according to the brightness information and provides the signal to the backlight controller 270.

If a brightness of a backlight is determined, a final output image is calculated adaptively. If the foregoing process is not performed, the image may be deteriorated and thus a portion of the image with high backlight brightness is saturated and a detail of another portion of the image with low backlight brightness is dark and is not seen. The final output image may be obtained by the following formula 1 by taking into account backlight output brightness:

$$Y_{LCD} = Y_{input} / Y_{backlight} \quad \text{[Formula 1]}$$

Figure 7:
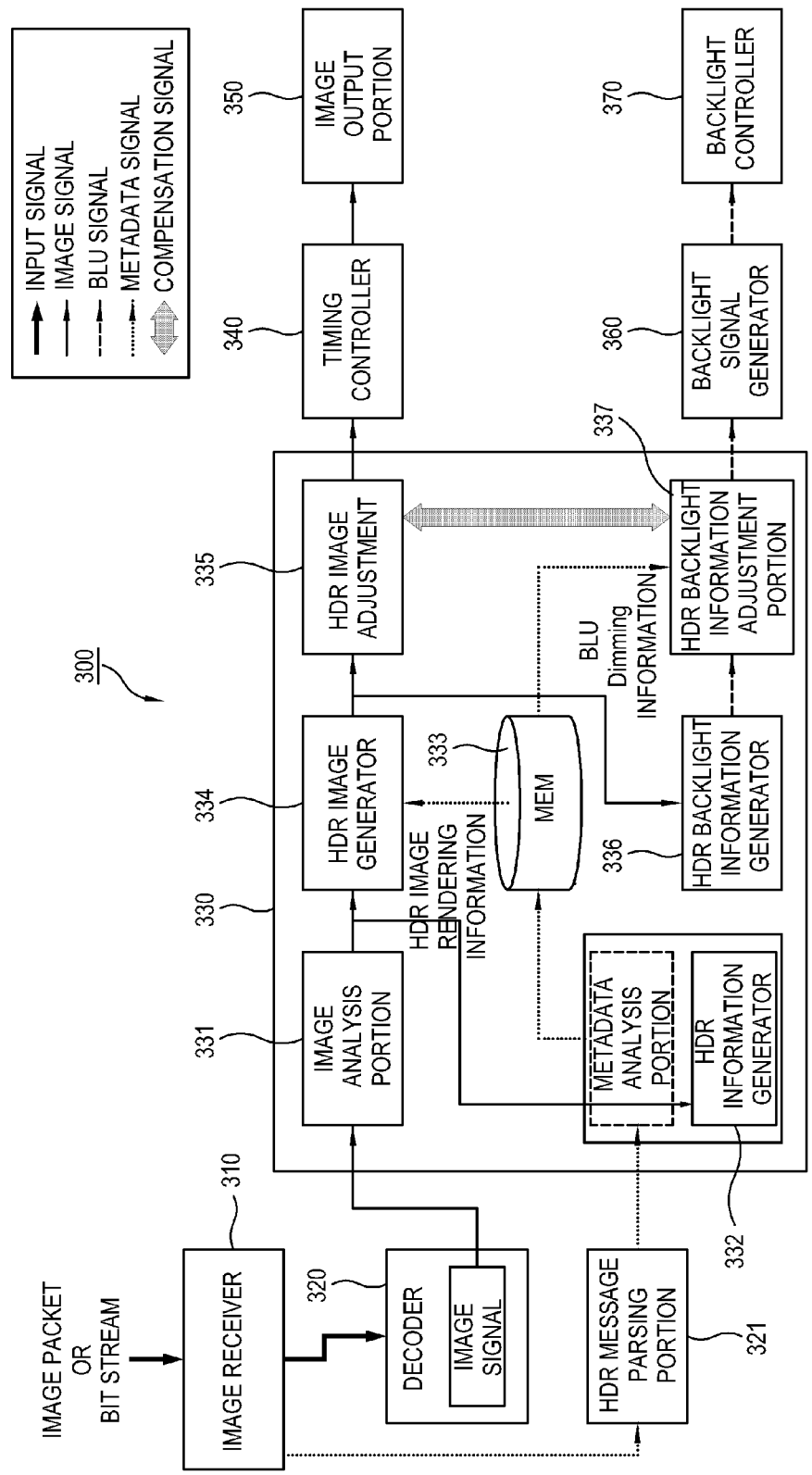
FIG. 7 illustrates a display device according to a second exemplary embodiment.

FIG. 7 illustrates a display device 300 according to a second exemplary embodiment. The display device 300 according to the second exemplary embodiment is similar to the display device 200 according to the first exemplary embodiment shown in FIG. 6, but may process an HDR image if no metadata including HDR information is provided from the outside. The display device 300 according to the second exemplary embodiment may process an image in the following three manners, differently from the first exemplary embodiment. The portion of the display device 300 that is similar to the first exemplary embodiment in FIG. 6 will not be explained for the sake of brevity.

First, the image analysis portion 331 may analyze a received image signal, and the HDR information generator 332 may generate HDR information based on the image signal analyzed by the image analysis portion 331. The generated HDR information is used to generate and adjust an HDR image. The process of generating and adjusting HDR backlight information may be the same as that in the first exemplary embodiment in FIG. 6.

Second, the image analysis portion 331 may analyze a received image signal and the HDR information stored in the storage portion 333 may be used. The HDR information stored in the storage portion 333 is stored in advance in relation to other image signals, and may not be proper to directly apply to the received image signal. The HDR information stored in advance in the storage portion 333 may be compensated for on the basis of analysis results of the image signal related to the previous HDR information and a newly received image signal. If the image signal related to the previous HDR information and the newly received image signal are analyzed, the image signals may be compared for each frame or each scene, and if the image signals are similar to each other, the previous HDR information may be used as is without adjustment. A maximum brightness and minimum brightness of a particular area may be increased or reduced according to the comparison results of the image signals.

Adjustment of the HDR information may be implemented by software that is made according to regulations for items. Likewise, the process of generating and adjusting the HDR image by using the HDR information stored in the storage portion 333 or the adjusted HDR information and the process of generating and adjusting the HDR backlight information may be the same as the processes according to the first exemplary embodiment shown in FIG. 6.

Third, the HDR backlight information generator 336 may estimate and generate HDR backlight information by using only the received image signal, and the HDR backlight adjustment portion 337 may adjust the generated HDR backlight information. The HDR image adjustment portion 335 may adjust the received image signal by reflecting the adjusted HDR backlight information, rather than generating the HDR information itself. Estimation of the HDR backlight information by the HDR backlight information generator 336 using the image signal only may be implemented by software that is made according to regulations for items of the HDR backlight information. Because there is no metadata, the system should determine a backlight level according to the software. The HDR backlight information generator 336 generates backlight information, locally or globally, depending on image displaying devices.

Figure 8:
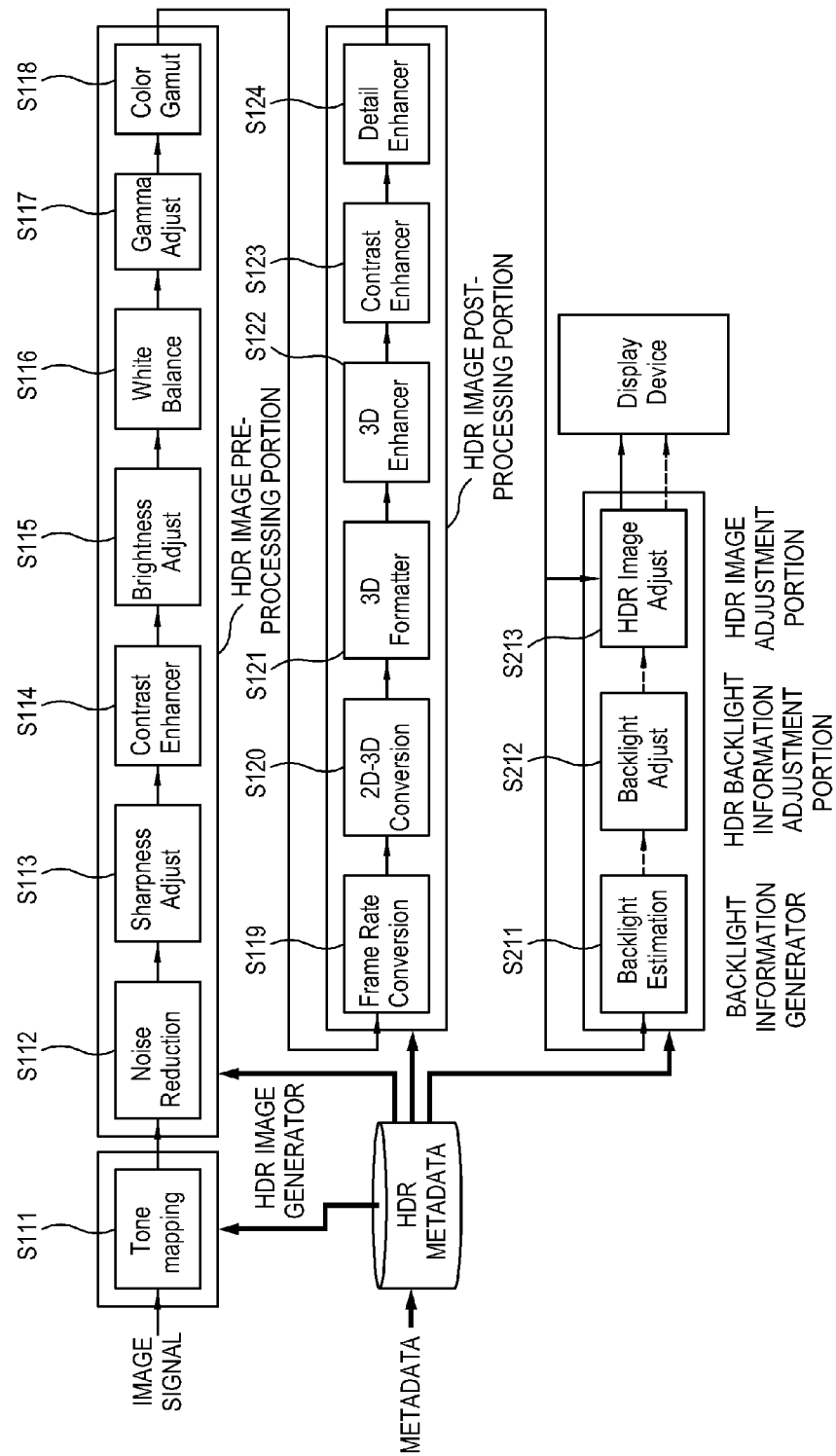
FIG. 8 illustrates an HDR image processing operation using metadata including an image signal and HDR information according to an exemplary embodiment.

FIG. 8 illustrates an HDR image processing operation using metadata including a received image signal and HDR information.

HDR image pre-processing using an image signal and HDR metadata may be performed at operations S111 to S118. The operations S111 to S118 for the HDR image pre-processing includes tone mapping, noise reduction, sharpness adjust, contrast enhancer, brightness adjust, white balance adjust, gamma adjust and color gamut adjust.

HDR image post-processing using the pre-processed HDR image signal and HDR metadata may be performed at operations S119 to S124. The operations S119 to S124 for HDR image post-processing includes frame rate conversion, 2D/3D conversion, 3D formatting, 3D enhancer, contrast enhancer and detail enhancer.

HDR backlight information processing using the post-processed HDR image signal and HDR metadata may be performed at operations S211 to S213. The operations S211 to S213 for HDR backlight information processing includes backlight information estimation by the backlight generators 236 and 336, HDR backlight adjust by the HDR backlight information adjustment portions 237 and 337, and HDR image adjust by the HDR image adjustment portions 235 and 335.

Finally, the HDR backlight information of the HDR backlight information adjustment portions 237 and 337 and the HDR image of the HDR image adjustment portions 235 and 335 may be transmitted to the image output portion and the backlight controller to display the HDR image.

Figure 9:
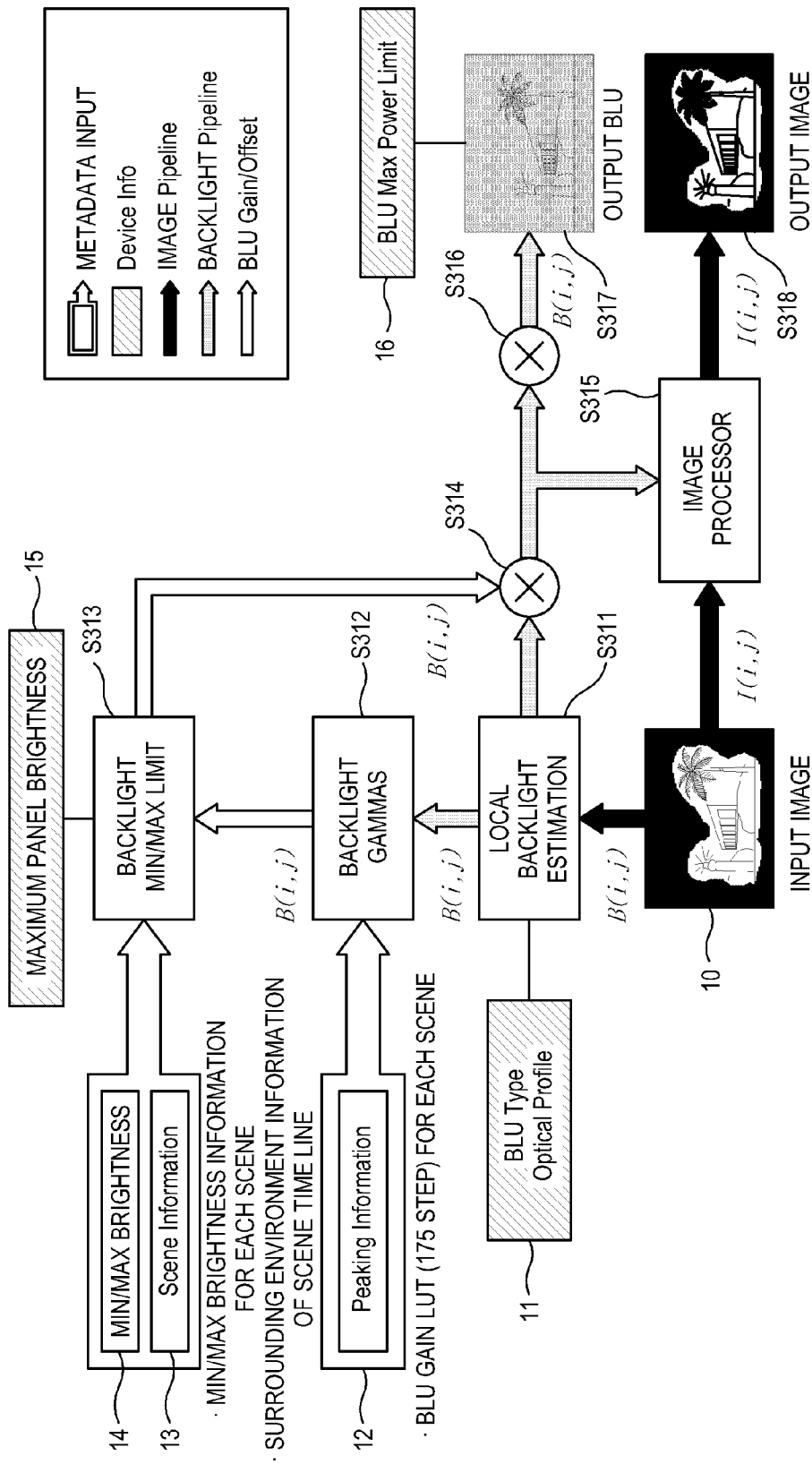
FIG. 9 illustrates a process of using HDR metadata by the display device according to an exemplary embodiment.

FIG. 9 illustrates a process of processing an HDR image by using HDR metadata and display device information according to an exemplary embodiment.

As shown therein, local backlight information estimation may be performed with respect to an input image 10 by using backlight device information called "BLU type optical profile 11" (S311).

Backlight gamma adjust may be performed with respect to the estimated backlight information by using HDR metadata called "backlight peaking information 12 of a backlight gain LUT for each frame or each scene" (S312).

Backlight minimum and maximum brightness may be limited with respect to the adjusted backlight information by using HDR metadata called "min/max brightness information for each frame or each scene 14" and "scene information including surrounding environment information of a scene timeline", and panel device information called "maximum panel brightness information" (S313).

The HDR backlight information to which the HDR metadata and device information have applied at operations S312 and S313 and the local backlight information estimated at operation S311 are mixed to each other (S314).

HDR image processing is performed with respect to the received input image by using the HDR backlight information mixed at operation S314 (S315). The HDR backlight information adjusted at operation S316 may be used to adjust the HDR image that has been processed and generated at operation S315 (S315).

The HDR backlight information that is mixed at operation S314 is adjusted by referring to the HDR image processed, generated and adjusted at operation S315 (S316).

The HDR backlight information adjusted at operation S316 is adjusted by using device information called backlight maximum power limitation information 16 (S317).

An image is output by using the HDR image adjusted at operation S315 and the HDR backlight information adjusted at operation S317 (S318).

Referring to FIGS. 10 to 13, a method of processing an HDR image by using HDR metadata and device information will be described in detail.

Figure 10:
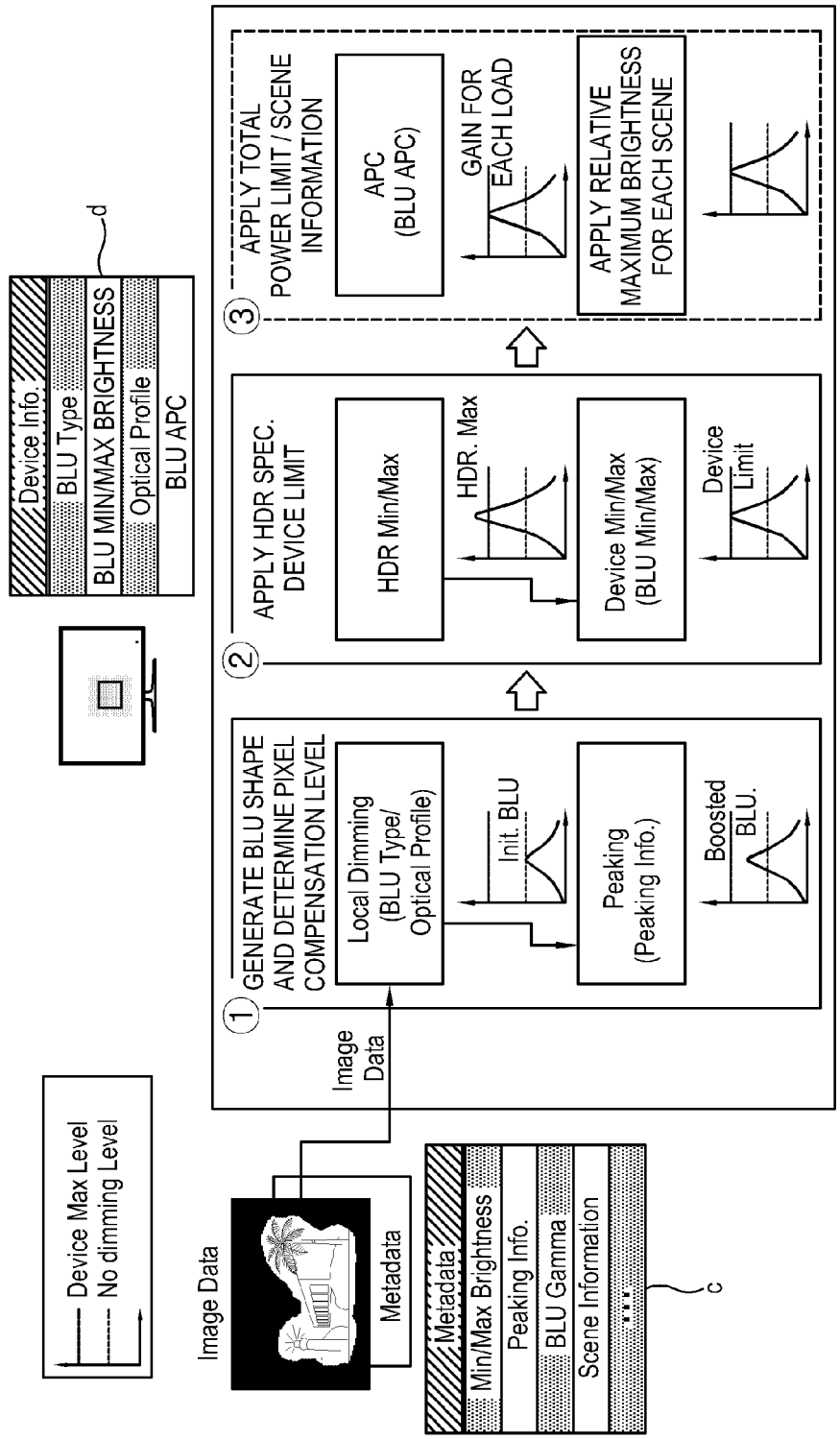
FIG. 10 illustrates a processing operation for backlight information by using HDR metadata according to an exemplary embodiment.

FIG. 10 illustrates a process of processing HDR backlight information by using HDR metadata and display device information. The used HDR metadata includes min/max brightness information, peaking information, backlight gamma information and scene information as shown in c in FIG. 10. The used displayed device information includes BLU type information, BLU min/max brightness information, BLU optical profile, and backlight advanced power control (APC) information as shown in d in FIG. 10.

In FIG. 10, ① shows generation of backlight light type and determination of pixel compensation level by using local dimming information such as BLU type information and optical profile information and peaking information.

The metadata called peaking information is a backlight transfer curve. The peaking information may be expressed as another gain curve depending on the type of backlight light source, i.e., edge type or direct type, or the number of blocks. The peaking information is input by an input image, and the display device may apply the gain curve to the backlight information that has been calculated through backlight estimation.

Figure 11:
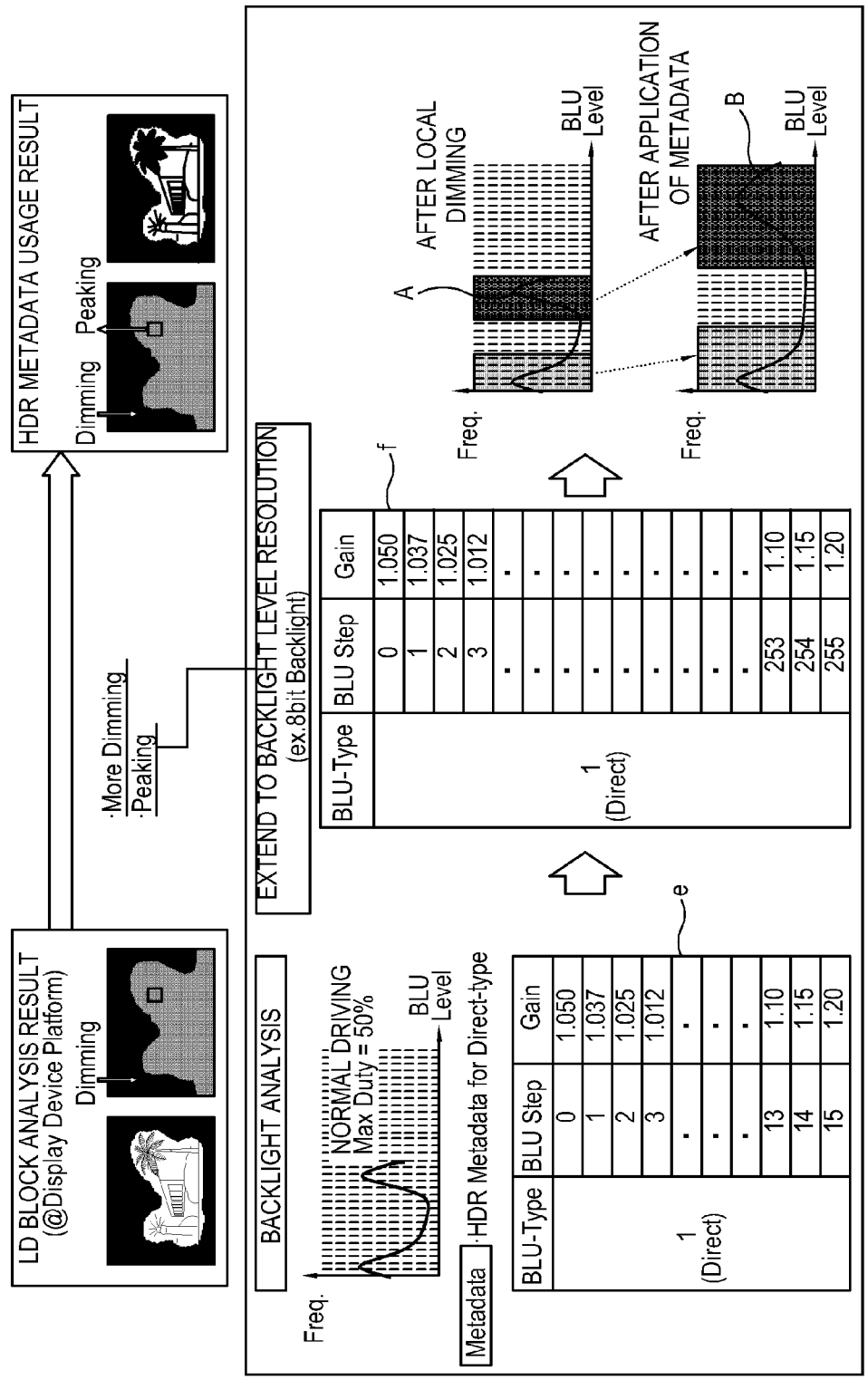
FIG. 11 illustrates application of backlight peaking information of HDR metadata according to an exemplary embodiment.

A method of applying the metadata of the peaking information will be described with reference to FIG. 11.

ⓐ Backlight brightness information is calculated for each block through backlight estimation. The backlight brightness information may be calculated for each block because a local driving of the backlight is important to display an HDR image. That is, an image may be divided into several areas, and it may be determined whether to reduce or increase backlight of the areas compared to the initial value of the backlight of a normal TV rather than the HDR driving.

ⓑ The peaking information which may be the same as a left lookup table (e) in FIG. 11 which has been transmitted as HDR metadata is interpolated to be extended to backlight level resolution of the display device as shown in a right lookup table (f) in FIG. 11.

ⓒ A calculated peaking gain may be applied to backlight levels as the backlight estimation result to thereby obtain backlight peaking information. A left lookup table (gain information that is in the form of a table) (e) in FIG. 11 may be obtained as HDR metadata. The lookup table (e) may be obtained for each frame or each sequence of a particular scene. The lookup table (e) shows gain information on the increase or decrease in the quantity of the backlight information calculated in ⓐ above. The gain information may apply to each backlight level calculated in ⓐ above.

A graph A in FIG. 11 shows a gain curve after local dimming with respect to the lookup table (e). A graph B refers to a gain curve of a right lookup table (f) that extends to backlight level resolution after the application of the metadata.

In FIG. 10, ② shows application of device limitation to HDR specification by using HDR min/max brightness information and BLU min/max brightness information.

Implementing an HDR image using min/max brightness for each frame or each scene and scene information will be described in detail.

ⓐ First, min/max brightness metadata information is analyzed.

ⓑ An estimated brightness of a maximum brightness area and an estimated brightness of a minimum brightness area are calculated in the case where an HDR image is displayed by a currently calculated backlight value.

ⓒ A global gain that may be multiplied by a current backlight level to obtain a maximum brightness is calculated. It is determined whether to implement offset to apply a minimum brightness, e.g., to implement offset to process block areas or to remove a stepped difference.

As described above, information of minimum and maximum brightness that should be expressed by a current input image is obtained by using the metadata, and the obtained information may apply to an area which should have a maximum brightness and to another area which should have a minimum brightness. If an image has a very bright portion and a very dark portion therein, brightness information of the two portions may be obtained and used to display an HDR image after adjustment by the display device, e.g., after adjustment of gain or offset.

Figure 12:
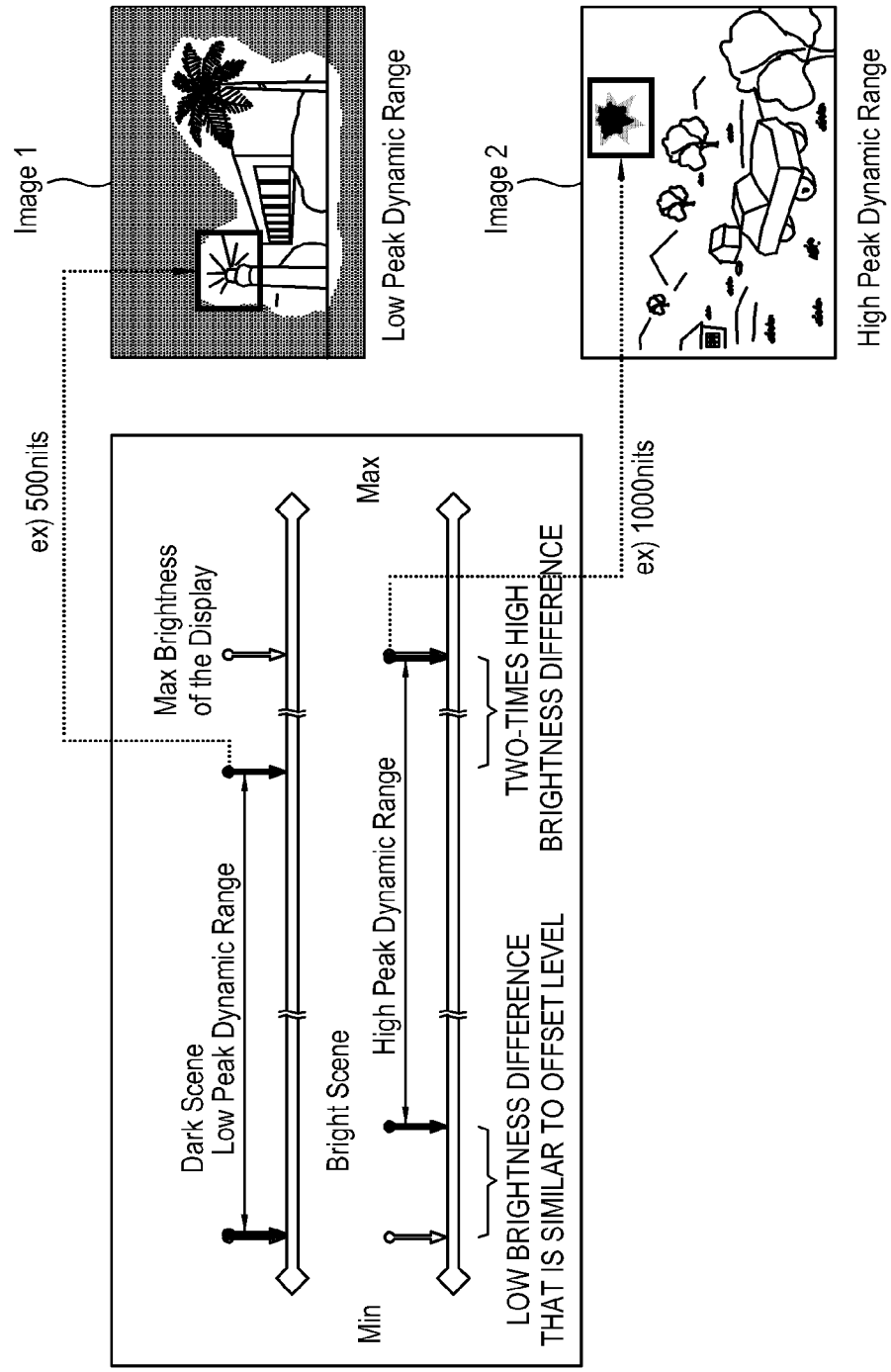
FIG. 12 illustrates adjustment of minimum and maximum brightness for each scene by using HDR metadata according to an exemplary embodiment.

FIG. 12 illustrates a method of selectively applying a dynamic range according to image information. As seen from two images 1 and 2 in FIG. 12, the display device according to an exemplary embodiment may implement different peaking brightness and provide realistic experience by obtaining min/max brightness information for each frame or each scene if min/max brightness expressiveness of the display device is set. That is, the display device may obtain information on different min/max brightness ranges depending on frames or scenes, and change the min/max brightness of the backlight information calculated in ① above.

After the min/max brightness is calculated by using the HDR metadata, the min/max brightness may be mapped to a brightness area that may be displayed by the display device. This may be because there are display devices that may fully display the min/max brightness of the HDR metadata but also many other display devices that may not do so.

ⓐ First, a compensation gain is calculated by using HDR maximum brightness and display device maximum brightness.

ⓑ The calculated compensation gain is used as a global gain to calculate the HDR brightness.

③ FIG. 10 shows total power limit and application of relative maximum brightness for each scene by using APC information of the display device and scene information.

According to an exemplary embodiment, a method of applying the APC information of the display device is as follows:

ⓐ The display device calculates or has an APC curve.

ⓑ An APC gain is used to limit total power consumed by the system.

According to an exemplary embodiment, a method of applying HDR scene information metadata is as follows:

ⓐ Scene information metadata is analyzed.

ⓑ A gain against maximum brightness of the display device is calculated by using scene information on whether a current image has been photographed under a lighting or photographed by day light or photographed indoors or outdoors.

ⓒ A global gain that should be multiplied by a current backlight level is calculated. It is determined whether to implement offset to apply a minimum brightness, i.e. whether to implement offset to process block areas or to remove a stepped difference.

Figure 13:
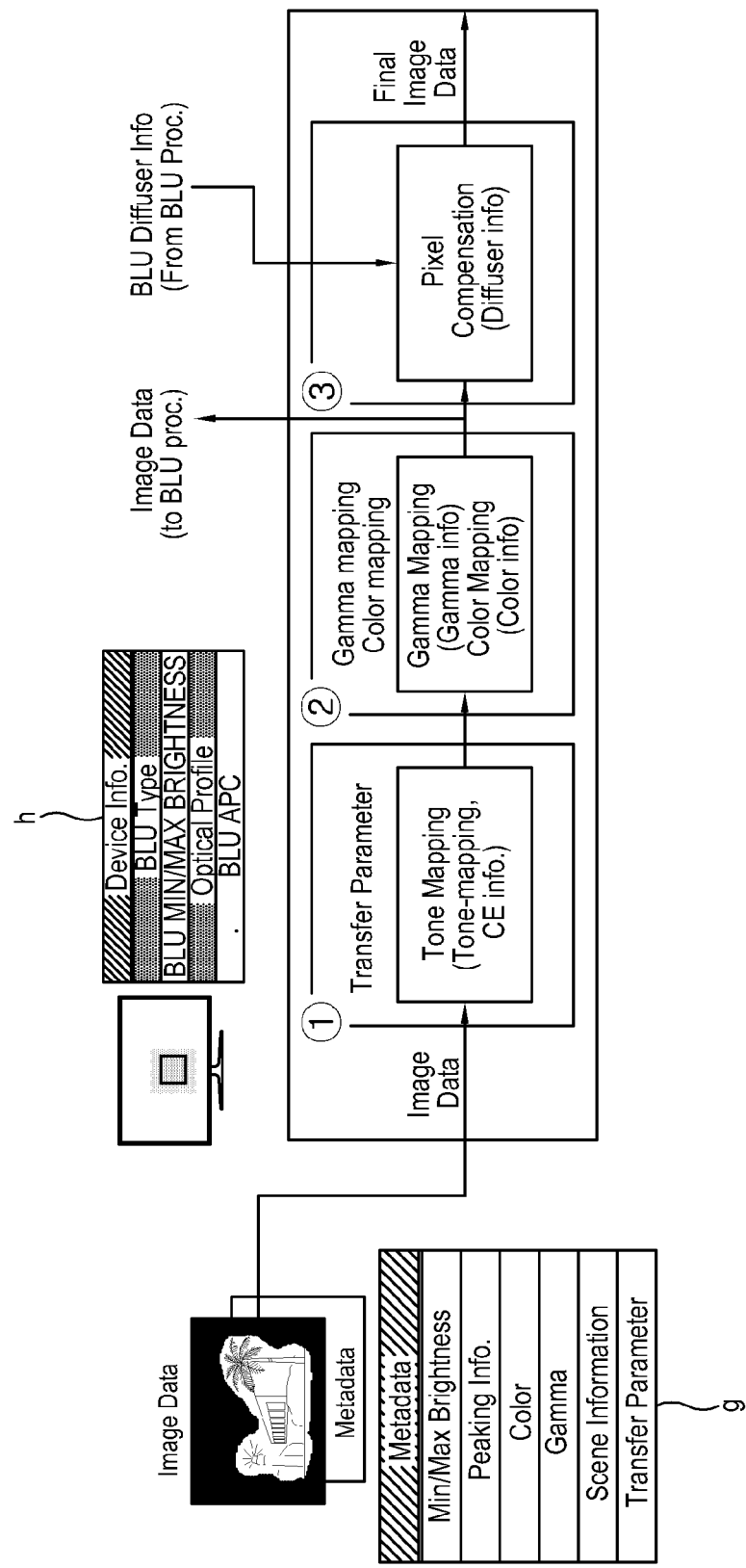
FIG. 13 illustrates tone mapping, gamma mapping, color mapping and pixel compensation by using HDR metadata according to an exemplary embodiment.

FIG. 13 illustrates tone-mapping for adjusting a change in a bit resolution of an image, gamma and color mapping for adjusting an image according to features of the display device or for improvement of a picture quality, and an adjustment process necessary for an image after a backlight control. The tone-mapping, gamma mapping, color mapping and pixel compensation may use transfer parameter, contrast enhancement information, gamma information and color information as HDR metadata as shown in g in FIG. 13, and may use BLU type information, BLU min/max brightness information, optical profile, BLU APC information and BLU diffuser information as device information as shown in h in FIG. 13.

In FIG. 13, ① shows tone mapping and a CE curve of an input image that use transfer parameter metadata.

Tone mapping is a signal processing method for changing input signal (RGB or YCbCr ...) information of an image to a level requested by a user (developer), and if tone mapping is performed, a dark side or a bright side of an image may be expressed in more detail, or black may be emphasized or a bright side may become brighter.

Tone mapping may be performed by using a global tone mapping operator like the [formula 2] set forth below:

$$V_{out}=V_{in}/(V_{in}+1) \quad \text{[Formula 2]}$$

Hereinafter, a method of obtaining the CE curve using CE information will be described.

Figure 14:
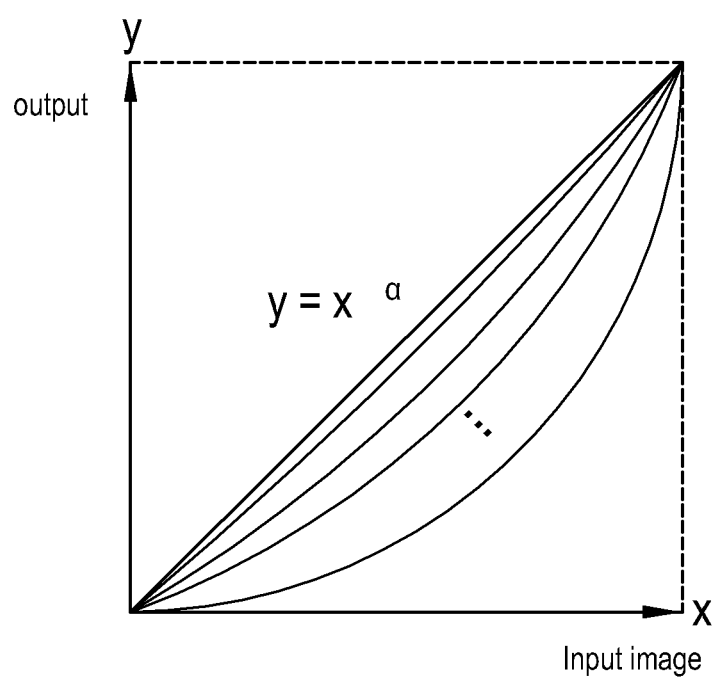
FIG. 14 illustrates a lower mapping function for enhancing contrast according to an exemplary embodiment.

As shown in FIG. 14, "Lower curve degree (bl)" in Table 5 applies to the following [formula 3]:

$$Y=x-bl^*(x-x2) \quad \text{[Formula 3]}$$

Figure 15:
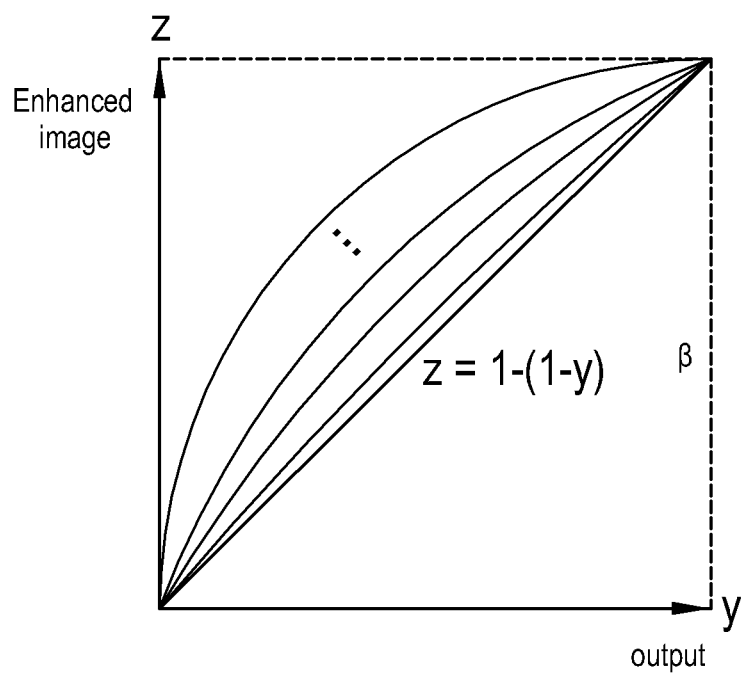
FIG. 15 illustrates an upper mapping function for enhancing contrast according to an exemplary embodiment.

As shown in FIG. 15, "Upper curve degree (bu)" in Table 5 applies to the following [formula 4]:

$$y=x-bu^*(x2-x) \quad \text{[Formula 4]}$$

Figure 16:
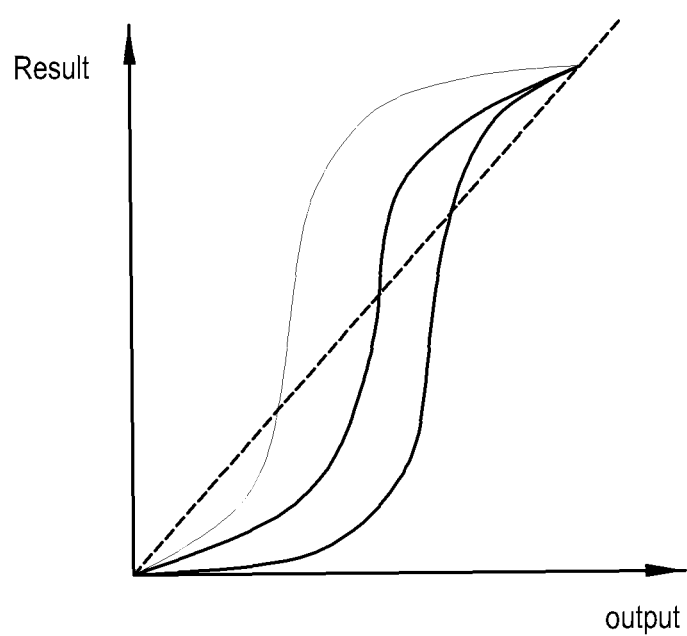
FIG. 16 illustrates a contrast enhancement curve by applying mapping function for enhancing contrast according to an exemplary embodiment.

As a result, an "S"-shaped CE curve may be obtained as shown in FIG. 16.

In FIG. 13, ② shows gamma mapping and color mapping that use gamma information and color information.

Gamma mapping is a method of changing an image input signal consistently with data processing features of the display device.

An image signal may be adjusted before display so that the image signal produces 2.2 (gamma) after gamma adjustment by the display device.

Gamma mapping may properly adjust an image so that the image may have desired gamma features (2.2. or 2.3 ... ) after being displayed.

Color mapping that uses color information may be performed by adjusting, e.g., RGB color gain and offset adjustment.

Color mapping is a method of adjusting an image signal in advance to display an image in a desired color in respect of color features of the image output to the display device. Red, blue or green color signals may be emphasized or overall color sense may be adjusted.

In FIG. 13, ③ shows pixel adjustment that uses BLU diffuser information of the display device.

Hereinafter, pixel compensation that uses BLU diffuser information with respect to input image data to which the tone mapping, contrast enhancement, gamma mapping and color mapping have applied will be described with reference to FIG. 17.

A display device is largely classified into a self-emitting display device (such as a plasma display panel (PDP) or an organic light emitting diode (OLED) that emits light in RGB colors), and a non-emitting display device (a liquid crystal display (LCD) that uses a light source and a color filter (RGB) to express colors), wherein the LCD employs a backlight unit and includes a diffuser to diffuse light to thereby prevent the shape of the backlight unit from being recognized by user's eyes.

Figure 17:
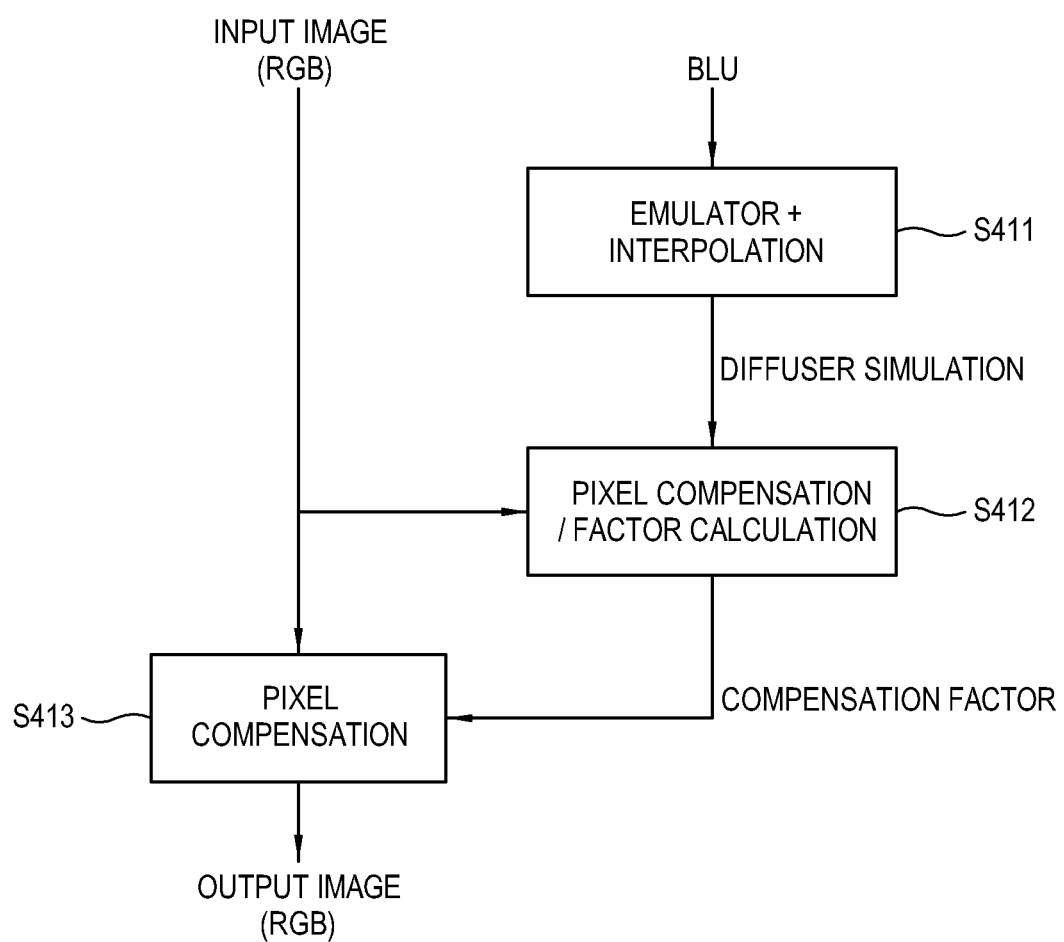
FIG. 17 illustrates a pixel compensation process by using backlight diffuser information according to an exemplary embodiment.
Figure 18:
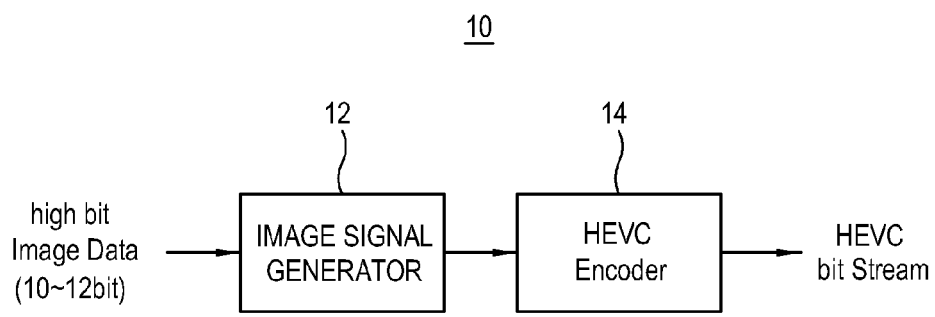
FIG. 18 is a block diagram of an image processing device.
Figure 19:
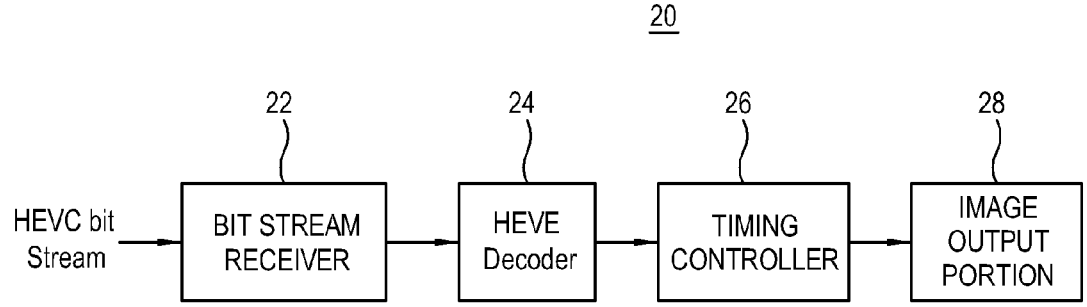
FIG. 19 is a block diagram of a display device.

In FIG. 17, BLU emulator and interpolation are performed to estimate how an image is displayed by the display device when the BLU is turned on in practice after receiving BLU driving information generated by a picture quality engine of the display device (S411).

Diffuser simulation is performed to calculate a panel output shape with respect to each location of the panel, and if the diffuser simulation result is obtained, pixel compensation value of the respective pixel locations may be estimated because the BLU output value of such locations have been estimated (S412). That is, a pixel compensation factor of respective pixel locations may be calculated.

Pixel compensation may be performed with respect to the input image by using the pixel compensation factor calculated at S412 (S413).

The order of processing the respective HDR image processing blocks of the display device 200 explained as above may be properly changed depending on circumstances. Metadata that is used at the respective operations may also apply to one or two or more blocks.

According to one or more exemplary embodiments, HDR metadata may be properly generated and transmitted together with an image to display an optimum HDR image by a display device through existing codec. The display device may play an optimum HDR image that is consistent with a content producer's intention.

Displaying an HDR image of an input image by using the HDR metadata and device information merely amounts to an exemplary embodiment, and is not limited thereto.

The display device according to one or more exemplary embodiments may transmit image data with relative lower bits such as HD or FHD image, together with HDR information that is obtained during production of images. The display device or set-top box may analyze the HDR information and generate and display an HDR image based on the low-bit image to thereby express the image closely to 12-bit or 16-bit UHD image through HDTV or FHD TV.

The display device according to one or more exemplary embodiments may express a relatively high quality image by using a narrower bandwidth.

The display device according to one or more exemplary embodiments may express a high quality image with HDR information by taking into account its features, more particularly, BLU or maximum set power.

The display device may display an image at a brightness ratio similarly to a ratio in the real image capturing environment and may display an HDR image by using an adaptive dynamic range utilization method and image controlling method using metadata and features of the display device, and by using the method of adjusting brightness of a dark side and a bright side an dynamic range.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. An image processing device for processing an image signal comprising:
   a metadata generator configured to generate metadata comprising high dynamic range (HDR) information of an image signal;
   an image encoder configured to encode the image signal as one of packetized image data of the encoded image signal and a bit stream of image data of the encoded image signal; and
   an HDR message generator configured to generate an HDR message comprising the generated metadata in a reserved area of the one of the packetized image data and the bit stream, wherein the HDR information comprises at least one of:
   minimum and maximum brightness value for each scene or frame;
   backlight peaking information comprising backlight unit (BLU) brightness mapping parameter for each scene or frame;
   color specification information comprising color gamut and color temperature of an image;
   a transfer parameter comprising gamma adjust and contrast enhancement (CE) control parameter;
   scene information comprising surrounding environment information of a scene or frame timeline;
   histogram information showing lowest, highest and most frequent pixel value information;
   sharpness information showing strength information of a boundary area of an image; and
   correlation information of scenes or frames,
   wherein the HDR information comprises a compulsory HDR information and an optional HDR information which assists with the compulsory HDR information,
   wherein the compulsory HDR information is always included in the metadata when one of the packetized image data and the bit stream is to be transmitted,
   wherein the optional HDR information is sometimes omitted from the metadata when one of the packetized image data and the bit stream is to be transmitted, and
   wherein the HDR information is additional information which is produced at an initial phase of producing the image, and includes a dynamic range which is higher than a dynamic range of the image.

2. The image processing device of claim 1,
   wherein the reserved area comprises at least one of a picture parameter set (PPS) extended data area and a supplemental enhancement information (SEI) data area of a network abstraction layer (NAL) unit.

3. The image processing device of claim 1, wherein the metadata is included in an extended layer of the packetized image data or the bit stream.

4. The image processing device of claim 1, wherein the metadata is included in a base layer of the packetized image data or the bit stream.

5. The image processing device of claim 1, wherein the metadata is included in an extended layer and a base layer of the packetized image data or the bit stream.

6. The image processing device of claim 1, wherein the metadata comprises first metadata of a first scene or frame, and wherein second metadata of a second scene or frame adjacent to the first scene or frame that is the same as the first metadata is omitted.

7. The image processing device of claim 1, wherein correlation of the scenes or frames comprises correlation of metadata of scenes or frames.

8. The image processing device of claim 1, wherein the HDR information further comprises two or more of:
   minimum and maximum brightness value for each scene or frame;
   backlight peaking information comprising backlight unit (BLU) brightness mapping parameter for each scene or frame;
   color specification information comprising color gamut and color temperature of an image;
   a transfer parameter comprising gamma adjust and contrast enhancement (CE) control parameter;
   scene information comprising surrounding environment information of a scene or frame timeline;
   histogram information showing lowest, highest and most frequent pixel value information;
   sharpness information showing strength information of a boundary area of an image; and
   correlation information of scenes or frames.

9. The image processing device of claim 1, wherein the HDR information further comprises at least one of:
   scene information comprising surrounding environment information of a scene or frame timeline;
   sharpness information showing strength information of a boundary area of an image; and
   correlation information of scenes or frames.

10. A display device for processing and displaying an image signal comprising:
    an image receiver configured to receive packetized image data of an encoded image signal or a bit stream of image data of the encoded image signal;
    a decoder configured to parse metadata from the packetized image data or bit stream and decode the image signal from the image data of the encoded image signal; and
    an HDR image processor configured to analyze HDR information in the metadata, and generate an HDR image of the image signal from the analyzed HDR information and the decoded image signal,
    wherein the HDR information comprises at least one of:
    minimum and maximum brightness value for each scene or frame;
    backlight peaking information comprising backlight unit (BLU) brightness mapping parameter for each scene or frame;
    color specification information comprising color gamut and color temperature of an image;
    a transfer parameter comprising gamma adjust and contrast enhancement (CE) control parameter;
    scene information comprising surrounding environment information of a scene or frame timeline;
    histogram information showing lowest, highest and most frequent pixel value information;
    sharpness information showing strength information of a boundary area of an image; and
    correlation information of scenes or frames,
    wherein the HDR information comprises a compulsory HDR information and an optional HDR information which assists with the compulsory HDR information, wherein the compulsory HDR information is always included in the metadata when one of the packetized image data and the bit stream is to be transmitted, wherein the optional HDR information is sometimes omitted from the metadata when one of the packetized image data and the bit stream is to be transmitted, and wherein the HDR information is additional information which is produced at an initial phase of producing the image, and includes a dynamic range which is higher than a dynamic range of the image.

11. The display device of claim 10, wherein the HDR image processor is further configured to adjust the generated HDR image.

12. The display device of claim 11, wherein the HDR image processor is further configured to adjust the generated HDR backlight information using the adjusted HDR image.

13. The display device of claim 10, further comprising:
a storage portion configured to store the analyzed HDR information.

14. The display device of claim 10, wherein the HDR image processor is further configured to generate HDR backlight information using the generated HDR image.

15. The display device of claim 14, wherein the HDR image processor is further configured to adjust the generated HDR backlight information using the HDR information.

16. The display device of claim 15, wherein the HDR image processor is further configured to estimate a final output brightness level of an HDR image according to the generated HDR backlight information and compensate for deficient or excessive brightness.

17. The display device of claim 15, wherein the HDR image processor is further configured to adjust the generated HDR image using the adjusted HDR backlight information.

18. The display device of claim 15, wherein the adjusted HDR backlight information is adjusted by applying a maximum power limit of the backlight.

19. The display device of claim 14, wherein the HDR image processor is further configured to calculate a brightness output of the backlight according to following formula:

$$Y_{LCD} = Y_{input} / Y_{backlight}$$

20. The display device of claim 10, wherein the HDR image processor is further configured to obtain brightness information of a backlight local block using backlight peaking information of the HDR information.

21. The display device of claim 10, wherein the HDR image processor is further configured to obtain minimum brightness information and maximum brightness information of an HDR image using minimum brightness value and maximum brightness value of the HDR information for each scene or each frame.

22. The display device of claim 21, wherein the HDR image processor is further configured to perform mapping of minimum brightness information and maximum brightness information of the HDR image to minimum brightness information and maximum brightness information of a backlight by using minimum brightness value and maximum brightness value of the HDR information for each scene or each frame and scene information.

23. The display device of claim 10, wherein the HDR image processor is further configured to generate or adjust HDR backlight information using the HDR information, and display device information.

24. The display device of claim 23, wherein the HDR image processor is further configured to adjust the HDR backlight information using panel minimum brightness information and maximum brightness information.

25. The display device of claim 10, wherein the HDR image processor is further configured to perform tone mapping for adjusting a change in a bit resolution of an HDR image using a transfer parameter of the HDR information.

26. The display device of claim 10, wherein the HDR image processor is further configured to perform color mapping using the HDR information and backlight features.

27. A display device for processing and displaying an image signal comprising:
an image receiver configured to receive packetized image data of an encoded image signal or a bit stream of image data of the encoded image signal;
a decoder configured to parse metadata from the packetized image data or bit stream and decode the image signal from the image data of the encoded image signal;
a storage portion configured to store HDR information therein; and
an HDR image processor configured to generate an HDR image signal of the image signal from the stored HDR information and the decoded image signal,
wherein the HDR information comprises at least one of:
minimum and maximum brightness value for each scene or frame;
backlight peaking information comprising backlight unit (BLU) brightness mapping parameter for each scene or frame;
color specification information comprising color gamut and color temperature of an image;
a transfer parameter comprising gamma adjust and contrast enhancement (CE) control parameter;
scene information comprising surrounding environment information of a scene or frame timeline;
histogram information showing lowest, highest and most frequent pixel value information;
sharpness information showing strength information of a boundary area of an image; and
correlation information of scenes or frames,
wherein the HDR information comprises a compulsory HDR information and an optional HDR information which assists with the compulsory HDR information,
wherein the compulsory HDR information is always included in the metadata when one of the packetized image data and the bit stream is to be transmitted,
wherein the optional HDR information is sometimes omitted from the metadata when one of the packetized image data and the bit stream is to be transmitted, and
wherein the HDR information is additional information which is produced at an initial phase of producing the image, and includes a dynamic range which is higher than a dynamic range of the image.

28. The display device of claim 27, wherein the HDR image processor is further configured to adjust the generated HDR image.

29. The display device of claim 28, wherein the HDR image processor is further configured to generate HDR backlight information using the generated HDR image.

30. The display device of claim 29, wherein the HDR image processor is further configured to adjust the generated HDR backlight information using the HDR information.

31. The display device of claim 30, wherein the HDR image processor is further configured to estimate a final output brightness level of an HDR image according to the generated HDR backlight information, and compensate for deficient or excessive brightness.

32. The display device of claim 30, wherein the HDR image processor is further configured to adjust HDR information using the adjusted HDR backlight information or adjust the generated HDR backlight information using the adjusted HDR image.

33. A display device for processing and displaying an image signal comprising:
an image receiver configured to receive packetized image data of an encoded image signal or a bit stream of image data of the encoded image signal;
a decoder configured to parse metadata from the packetized image data or bit stream and decode the image signal from the image data of the encoded image signal; and
an HDR image processor configured to analyze the image signal, generate HDR information from the image signal, generate an HDR image from the HDR information and decoded image signal, and generate HDR backlight information using the HDR image,
wherein the HDR information comprises at least one of:
minimum and maximum brightness value for each scene or frame;
backlight peaking information comprising backlight unit (BLU) brightness mapping parameter for each scene or frame;
color specification information comprising color gamut and color temperature of an image;
a transfer parameter comprising gamma adjust and contrast enhancement (CE) control parameter;
scene information comprising surrounding environment information of a scene or frame timeline;
histogram information showing lowest, highest and most frequent pixel value information;
sharpness information showing strength information of a boundary area of an image; and
correlation information of scenes or frames,
wherein the HDR information comprises a compulsory HDR information and an optional HDR information which assists with the compulsory HDR information,
wherein the compulsory HDR information is always included in the metadata when one of the packetized image data and the bit stream is to be transmitted,
wherein the optional HDR information sometimes omitted from the metadata when one of the packetized image data and the bit stream is to be transmitted, and
wherein the HDR information is additional information which is produced at an initial phase of producing the image, and includes a dynamic range which is higher than a dynamic range of the image.

34. The display device of claim 33, wherein the HDR image processor is further configured to adjust the generated HDR image.

35. The display device of claim 34, wherein the HDR image processor is further configured to adjust the generated HDR backlight information using the HDR information.

36. The display device of claim 35, wherein the HDR image processor is further configured to estimate a final output brightness level of an HDR image according to the generated HDR backlight information, and compensate for deficient or excessive brightness.

37. The display device of claim 35, wherein the HDR image processor is further configured to adjust HDR information using the adjusted HDR backlight information or adjust the generated HDR backlight information using the adjusted HDR image.

38. A method for processing an image signal, the method comprising:
generating metadata comprising high dynamic range (HDR) information of an image signal;
encoding the image signal as one of packetized image data of the encoded image signal and a bit stream of image data of the encoded image signal; and
generating an HDR message comprising the generated metadata in a reserved area of the one of the packetized image data and the bit stream,
wherein the HDR information comprises at least one of:
minimum and maximum brightness value for each scene or frame;
backlight peaking information comprising backlight unit (BLU) brightness mapping parameter for each scene or frame;
color specification information comprising color gamut and color temperature of an image;
a transfer parameter comprising gamma adjust and contrast enhancement (CE) control parameter;
scene information comprising surrounding environment information of a scene or frame timeline;
histogram information showing lowest, highest and most frequent pixel value information;
sharpness information showing strength information of a boundary area of an image; and
correlation information of scenes or frames,
wherein the HDR information comprises a compulsory HDR information and an optional HDR information which assists with the compulsory HDR information,
wherein the compulsory HDR information is always included in the metadata when one of the packetized image data and the bit stream is to be transmitted,
wherein the optional HDR information is sometimes omitted from the metadata when one of the packetized image data and the bit stream is to be transmitted, and
wherein the HDR information is additional information which is produced at an initial phase of producing the image, and includes a dynamic range which is higher than a dynamic range of the image.

39. A method for processing an image signal, the method comprising:
receiving packetized image data of an encoded image signal or a bit stream of image data of the encoded image signal;
parsing metadata from the packetized image data or bit stream and decode the image signal from the image data of the encoded image signal;
analyzing HDR information in the metadata; and
generating an HDR image of the image signal from the analyzed HDR information and the decoded image signal,
wherein the HDR information comprises at least one of:
minimum and maximum brightness value for each scene or frame;
backlight peaking information comprising backlight unit (BLU) brightness mapping parameter for each scene or frame;
color specification information comprising color gamut and color temperature of an image;
a transfer parameter comprising gamma adjust and contrast enhancement (CE) control parameter;
scene information comprising surrounding environment information of a scene or frame timeline;
histogram information showing lowest, highest and most frequent pixel value information;
sharpness information showing strength information of a boundary area of an image; and
correlation information of scenes or frames, wherein the HDR information comprises a compulsory HDR information and an optional HDR information which assists with the compulsory HDR information, wherein the compulsory HDR information is always included in the metadata when one of the packetized image data and the bit stream is to be transmitted, wherein the optional HDR information is sometimes omitted from the metadata when one of the packetized image data and the bit stream is to be transmitted, and wherein the HDR information is additional information which is produced at an initial phase of producing the image, and includes a dynamic range which is higher than a dynamic range of the image.

40. The method of claim 39, further comprising: adjusting the generated HDR image.

41. The method of claim 40, further comprising: generating HDR backlight information using the generated HDR image.

42. The method of claim 41, further comprising: adjusting the generated HDR backlight information using the HDR information.

43. The method of claim 42, further comprising:
estimating a final output brightness level of the HDR image according to the generated HDR backlight information; and
compensating for deficient or excessive brightness.

44. The method of claim 42, further comprising:
adjusting the HDR image using the HDR backlight information; or
adjusting the HDR backlight information using the HDR image.

45. A method for processing an image signal, the method comprising:
receiving packetized image data of an encoded image signal or a bit stream of image data of the encoded image signal;
parsing metadata from the packetized image data or bit stream and decode the image signal from the image data of the encoded image signal;
storing HDR information in a storage portion; and
generating an HDR image signal of the image signal from the stored HDR information and the decoded image signal,
wherein the HDR information comprises at least one of:
minimum and maximum brightness value for each scene or frame;
backlight peaking information comprising backlight unit (BLU) brightness mapping parameter for each scene or frame;
color specification information comprising color gamut and color temperature of an image;
a transfer parameter comprising gamma adjust and contrast enhancement (CE) control parameter;
scene information comprising surrounding environment information of a scene or frame timeline;
histogram information showing lowest, highest and most frequent pixel value information;
sharpness information showing strength information of a boundary area of an image; and
correlation information of scenes or frames,
wherein the HDR information comprises a compulsory HDR information and an optional HDR information which assists with the compulsory HDR information,
wherein the compulsory HDR information is always included in the metadata when one of the packetized image data and the bit stream is to be transmitted,
wherein the optional HDR information is sometimes omitted from the metadata when one of the packetized image data and the bit stream is to be transmitted, and
wherein the HDR information is additional information which is produced at an initial phase of producing the image, and includes a dynamic range which is higher than a dynamic range of the image.

46. The method of claim 45, further comprising: adjusting the generated HDR image.

47. The method of claim 46, further comprising: generating HDR backlight information using the generated HDR image.

48. The method of claim 47, further comprising: adjusting the generated HDR backlight information using the HDR information.

49. The method of claim 48, further comprising:
estimating a final output brightness level of the HDR image according to the generated HDR backlight information; and
compensating for deficient or excessive brightness.

50. The method of claim 48, further comprising:
adjusting the HDR image using the adjusted HDR backlight information; or
adjusting the generated HDR backlight information using the adjusted HDR image.

51. A method for processing an image signal, the method comprising:
receiving packetized image data of an encoded image signal or a bit stream of image data of the encoded image signal;
parse metadata from the packetized image data or bit stream and decode the image signal from the image data of the encoded image signal;
analyzing the image signal;
generating HDR information from the image signal;
generating an HDR image from the HDR information and decoded image signal; and
generating HDR backlight information using the HDR image,
wherein the HDR information comprises at least one of:
minimum and maximum brightness value for each scene or frame;
backlight peaking information comprising backlight unit (BLU) brightness mapping parameter for each scene or frame;
color specification information comprising color gamut and color temperature of an image;
a transfer parameter comprising gamma adjust and contrast enhancement (CE) control parameter;
scene information comprising surrounding environment information of a scene or frame timeline;
histogram information showing lowest, highest and most frequent pixel value information;
sharpness information showing strength information of a boundary area of an image; and
correlation information of scenes or frames,
wherein the HDR information comprises a compulsory HDR information and an optional HDR information which assists with the compulsory HDR information,
wherein the compulsory HDR information is always included in the metadata when one of the packetized image data and the bit stream is to be transmitted,
wherein the optional HDR information is sometimes omitted from the metadata when one of the packetized image data and the bit stream is to be transmitted, and
wherein the HDR information is additional information which is produced at an initial phase of producing the image, and includes a dynamic range which is higher than a dynamic range of the image.

52. The method of claim 51, further comprising:
adjusting a display HDR image to be displayed using the generated HDR image.

53. The method of claim 52, further comprising: adjusting the generated HDR backlight information using the HDR information.

54. The method of claim 53, further comprising:
estimating a final output brightness level of an HDR image according to the generated HDR backlight information; and compensating for deficient or excessive brightness.

55. The method of claim 53, further comprising: adjusting the HDR image using the adjusted HDR backlight information; or
adjusting the generated HDR backlight information using the adjusted HDR image.

56. A method for processing an image signal, the method comprising:
generating metadata from HDR information of an image signal; and
generating an HDR message comprising the metadata in a reserved area of at least one of a packet and a bit stream,
wherein the HDR information comprises at least one of:
minimum and maximum brightness value for each scene or frame;
backlight peaking information comprising backlight unit (BLU) brightness mapping parameter for each scene or frame;
color specification information comprising color gamut and color temperature of an image;
a transfer parameter comprising gamma adjust and contrast enhancement (CE) control parameter;
scene information comprising surrounding environment information of a scene or frame timeline;
histogram information showing lowest, highest and most frequent pixel value information;
sharpness information showing strength information of a boundary area of an image; and
correlation information of scenes or frames,
wherein the HDR information comprises a compulsory HDR information and an optional HDR information which assists with the compulsory HDR information,
wherein the compulsory HDR information is always included in the metadata when one of the packetized image data and the bit stream is to be transmitted,
wherein the optional HDR information is sometimes omitted from the metadata when one of the packetized image data and the bit stream is to be transmitted, and
wherein the HDR information is additional information which is produced at an initial phase of producing the image, and includes a dynamic range which is higher than a dynamic range of the image.

57. The method of claim 56, wherein the metadata comprises compulsory metadata that includes at least one of:
minimum/maximum brightness value for each scene or each frame;
backlight peaking information including brightness mapping parameter of a backlight unit for each scene or each frame;
color specification information including color gamut and color temperature of an image; and
a transfer parameter including gamma adjust and contrast enhancement (CE) control parameter.

58. The method of claim 56, wherein the metadata comprises optional metadata that includes at least one of:
scene information including surrounding environment information of a scene or frame timeline;
histogram information showing lowest, highest, and most frequent pixel value information; and
sharpness information showing strength information of a boundary area of an image.

59. The method of claim 56, further comprising:
encoding the image signal as one of packetized image data of the encoded image signal and a bit stream of image data of the encoded image signal.

* * * * *